US011983127B2

(12) United States Patent
Saito

(10) Patent No.: US 11,983,127 B2
(45) Date of Patent: May 14, 2024

(54) INFORMATION PROCESSING SYSTEM, INFORMATION PROCESSING METHOD, AND INFORMATION PROCESSING DEVICE TO REDUCE LOAD ON AN INFORMATION PROCESSING UNIT

(71) Applicant: SONY GROUP CORPORATION, Tokyo (JP)

(72) Inventor: Masataka Saito, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/757,215

(22) PCT Filed: Dec. 4, 2020

(86) PCT No.: PCT/JP2020/045170
§ 371 (c)(1),
(2) Date: Jun. 10, 2022

(87) PCT Pub. No.: WO2021/124917
PCT Pub. Date: Jun. 24, 2021

(65) Prior Publication Data
US 2023/0004510 A1    Jan. 5, 2023

(30) Foreign Application Priority Data

Dec. 18, 2019   (JP) ................... 2019-227916

(51) Int. Cl.
*G06F 13/28*   (2006.01)
(52) U.S. Cl.
CPC .................. *G06F 13/287* (2013.01)
(58) Field of Classification Search
CPC .......... G06F 13/14; G06F 13/20; G06F 13/28; G06F 13/287; G06F 13/32; G06F 13/36; G06F 13/362; G06F 13/38; G06F 13/40
See application file for complete search history.

(56) References Cited

U.S. PATENT DOCUMENTS 10,838,896 B2 *  11/2020  Karguth .............. G06F 13/4027
2005/0144338 A1 *  6/2005  Yamazaki ............... G06F 13/28
710/29

(Continued)

FOREIGN PATENT DOCUMENTS

JP    60-110072 A    6/1985
JP    08-63442 A    3/1996

(Continued)

OTHER PUBLICATIONS

International Search Report and Written Opinion of PCT Application No. PCT/JP2020/045170, dated Feb. 22, 2021, 08 pages of ISRWO.

*Primary Examiner* — Raymond N Phan
(74) *Attorney, Agent, or Firm* — CHIP LAW GROUP

(57) ABSTRACT

The present technology relates to an information processing system, information processing method, and information processing device capable of reducing load on an information processing unit in a case where data is shared among a plurality of information processing devices. There are included a first information processing device that controls DMA on the basis of a transfer parameter used for controlling transfer of data, and a second information processing device that communicates with the first information processing device, and controls DMA on the basis of the transfer parameter, in which the first information processing device generates the transfer parameter used for controlling reception of transfer data, and transmits the transfer parameter to the second information processing device, and the second information processing device controls reception of the transfer data from the first information processing device on the basis of the transfer parameter received from the first information processing device. The present technology can (Continued)

be applied to, for example, an apparatus including a multi-processor system.

19 Claims, 12 Drawing Sheets

(56) References Cited

U.S. PATENT DOCUMENTS

| | | |
|---|---|---|
| 2008/0086617 A1 | 4/2008 | Kasahara et al. |
| 2008/0147906 A1 | 6/2008 | Hamamura |
| 2012/0072629 A1* | 3/2012 | Tokuda ................ G06F 13/364 |
| | | 710/110 |
| 2016/0283415 A1* | 9/2016 | McBride ................ G06F 13/42 |
| 2019/0197018 A1* | 6/2019 | Evans ..................... G06F 13/28 |
| 2020/0133721 A1* | 4/2020 | Sasaki ................ G06F 9/30101 |

FOREIGN PATENT DOCUMENTS

| | | |
|---|---|---|
| JP | 2008-097084 A | 4/2008 |
| JP | 2008-146541 A | 6/2008 |

\* cited by examiner

INFORMATION PROCESSING SYSTEM, INFORMATION PROCESSING METHOD, AND INFORMATION PROCESSING DEVICE TO REDUCE LOAD ON AN INFORMATION PROCESSING UNIT

CROSS REFERENCE TO RELATED APPLICATIONS

This application is a U.S. National Phase of International Patent Application No. PCT/JP2020/045170 filed on Dec. 4, 2020, which claims priority benefit of Japanese Patent Application No. JP 2019-227916 filed in the Japan Patent Office on Dec. 18, 2019. Each of the above-referenced applications is hereby incorporated herein by reference in its entirety.

TECHNICAL FIELD

The present technology relates to an information processing system, an information processing method, and an information processing device, and more particularly, to an information processing system, information processing method, and information processing device suitable for use in a case where data is shared among a plurality of information processing devices.

BACKGROUND ART

In general, in a case where data is shared between processors in a multiprocessor system, a method for providing a shared memory shared between the processors or a method for sharing an address space of a memory in each of the processors is used (Refer to Patent Document 1, for example).

CITATION LIST

Patent Document

Patent Document 1: Japanese Patent Application Laid-Open No. H8-63442

SUMMARY OF THE INVENTION

Problems to be Solved by the Invention

However, the former method requires a shared memory that increases costs for hardware, and therefore, the former method is not very suitable for an embedded system, for example.

Furthermore, in the latter method, it is necessary to transfer data between the processors at all times so that the same data is stored in a region sharing the address space of the memory of each of the processors. Therefore, for example, load on a central processing unit (CPU) built in the processor increases.

The present technology has been made in view of such circumstances, and is to reduce load on an information processing unit such as a CPU in a case where data is shared between a plurality of information processing devices such as processors.

Solutions to Problems

An information processing system according to a first aspect of the present technology includes a first information processing device, and a second information processing device, in which the first information processing device includes a first information processing unit that generates a transfer parameter used for controlling transfer of data, a first direct memory access (DMA) control unit that controls DMA on the basis of the transfer parameter, and a first communication unit, the second information processing device includes a second information processing unit that generates the transfer parameter, a second DMA control unit that controls DMA on the basis of the transfer parameter, and a second communication unit that communicates with the first communication unit, the first information processing unit generates a first transfer parameter used for controlling reception of first transfer data, the first DMA control unit controls transmission of the first transfer parameter to the second information processing device, and the second DMA control unit controls reception of the first transfer data from the first information processing device on the basis of the first transfer parameter.

An information processing method according to a second aspect of the present technology includes a first information processing device that controls direct memory access (DMA) on the basis of a transfer parameter used for controlling transfer of data, and a second information processing device that communicates with the first information processing device, and controls DMA on the basis of the transfer parameter, in which the first information processing device generates the transfer parameter used for controlling reception of transfer data, and transmits the transfer parameter to the second information processing device, and the second information processing device controls reception of the transfer data from the first information processing device on the basis of the transfer parameter received from the first information processing device.

An information processing device according to a third aspect of the present technology includes an information processing unit that generates a transfer parameter used for controlling transfer of data, a direct memory access (DMA) control unit that controls DMA on the basis of the transfer parameter, and a communication unit that communicates with another information processing device, in which the information processing unit generates the transfer parameter used for controlling reception of transfer data, and the DMA control unit controls transmission of the transfer parameter to the another information processing device, the transfer parameter being used for controlling reception of the transfer data.

An information processing device according to a fourth aspect of the present technology includes a direct memory access (DMA) control unit that controls DMA on the basis of a transfer parameter used for controlling transfer of data, and a communication unit that communicates with another information processing device, in which the communication unit receives, from another information processing device, the transfer parameter used for controlling reception of transfer data, and the DMA control unit controls reception of the transfer data from the another information processing device on the basis of the transfer parameter received from the another information processing device.

In the first aspect or second aspect of the present technology, a first information processing device generates a transfer parameter used for controlling reception of transfer data, and controls transmission of the transfer parameter to the second information processing device, and the second information processing device controls reception of the transfer data from the first information processing device on the basis of the transfer parameter.

In the third aspect of the present technology, a transfer parameter used for reception control of transfer data is generated, and transmission of the transfer parameter used for controlling reception of the transfer data to the another information processing device is controlled.

In the fourth aspect of the present technology, reception of transfer data from the another information processing device is controlled on the basis of the transfer parameter received from the another information processing device.

MODE FOR CARRYING OUT THE INVENTION

Hereinafter, an embodiment for carrying out the present technology will be described. The description will be made in the following order.

1. Embodiment
2. Application example
3. Modifications
4. Others

1. Embodiment

An embodiment of the present technology will be described with reference to FIGS. 1 to 12.
<Configuration Example of Information Processing System 100>

Figure 1:
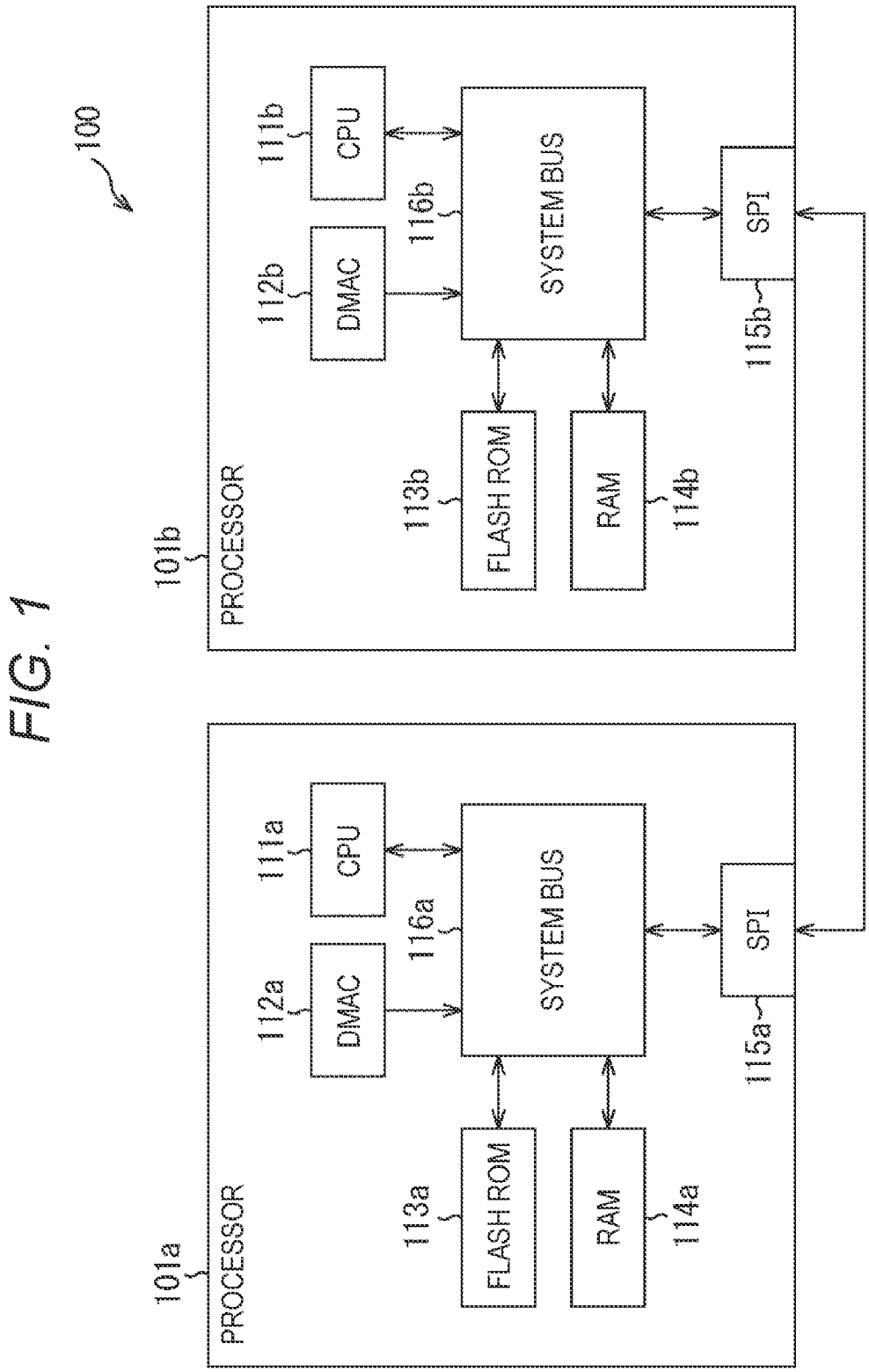
FIG. 1 is a block diagram illustrating a configuration example of an information processing system to which the present technology is applied.

FIG. 1 is a block diagram illustrating an embodiment of an information processing system 100 to which the present technology is applied.

The information processing system 100 is a multiprocessor system including a plurality of processors, and, for example, is incorporated in various apparatuses and performs predetermined processing.

The information processing system 100 includes a processor 101a and a processor 101b that are information processing devices including similar configurations. Note that a reference sign of each unit of the processor 101a is appended with a letter "a", and a reference sign of each unit of the processor 101b is appended with a letter "b".

The processor 101a and the processor 101b can independently perform predetermined processing. Furthermore, the processor 101a and the processor 101b support full-duplex serial communication, and can simultaneously perform asynchronous bidirectional communication. That is, transfer of data from the processor 101a to the processor 101b and transfer of data from the processor 101b to the processor 101a can be performed asynchronously and in parallel. Moreover, the processor 101a and the processor 101b share a part of data.

Hereinafter, a configuration of the processor 101a will be described. As described above, the processor 101b has a similar configuration to the processor 101a, and description thereof will be omitted.

The processor 101a includes a CPU 111a, a direct memory access controller (DMAC) 112a, a flash ROM 113a, a RAM 114a, a serial peripheral interface (SPI) 115a, and a system bus 116a. The CPU 111a, the DMAC 112a, the flash ROM 113a, the RAM 114a, and the SPI 115a are connected to one another via the system bus 116a.

The CPU 111a is an information processing unit that performs various processing and controls each unit of the processor 101a. Furthermore, the CPU 111a generates a transfer parameter used for controlling transfer of data by direct memory access (DMA) and stores the transfer parameter in a linked list item (LLI) region 151a of the RAM 114a, thereby setting the transfer parameter.

Note that a transfer parameter is stored in the LLI region 151a in a form of LLI. Each LLI includes a set of transfer parameters. Furthermore, an LLI is data having a linked list structure, and each LLI can be connected to another LLI in a linked manner.

Each LLI includes, for example, a transfer source address, a transfer destination address, a transfer attribute, and a link address.

The transfer source address indicates a transfer source of data to be transferred. Specifically, the transfer source address indicates an address (position) of a region in which data to be transferred is stored before transfer, the region being in an address space of the processor 101a or the processor 101b.

The transfer destination address indicates a transfer destination of data to be transferred. Specifically, the transfer destination address indicates an address (position) of a region in which data to be transferred is stored after the transfer, the region being in an address space of the processor 101a or the processor 101b.

The transfer attribute includes, for example, an attribute related to data transfer such as a size of data, addressing, or presence or absence of interrupt notification at a time of transfer completion, and control information.

The link address indicates an address (position) of a region in which an LLI of a link destination, that is, the LLI to be referred to next, is stored, the region being in an address space of the processor 101a or the processor 101b. The link address can be dynamically rewritten, and the LLI to be referred to next is changed by rewriting the link address.

The DMAC 112a controls a DMA. For example, the DMAC 112a sets a transfer parameter by reading the transfer parameter from the LLI region 151a of the RAM 114a and storing the transfer parameter in a built-in internal register. Then, for example, on the basis of the set transfer parameter, the DMAC 112a transfers data stored in the RAM 114a to the SPI 115a via the system bus 116a, thereby controlling transmission of the data to the processor 101b. Furthermore, for example, on the basis of the set transfer parameter, the DMAC 112a stores data, which is received by the SPI 115a, in the RAM 114a or the like via the system bus 116a, thereby controlling reception of the data from the processor 101b.

The flash ROM 113a stores a program or data necessary for processing by the processor 101a.

Figure 2:
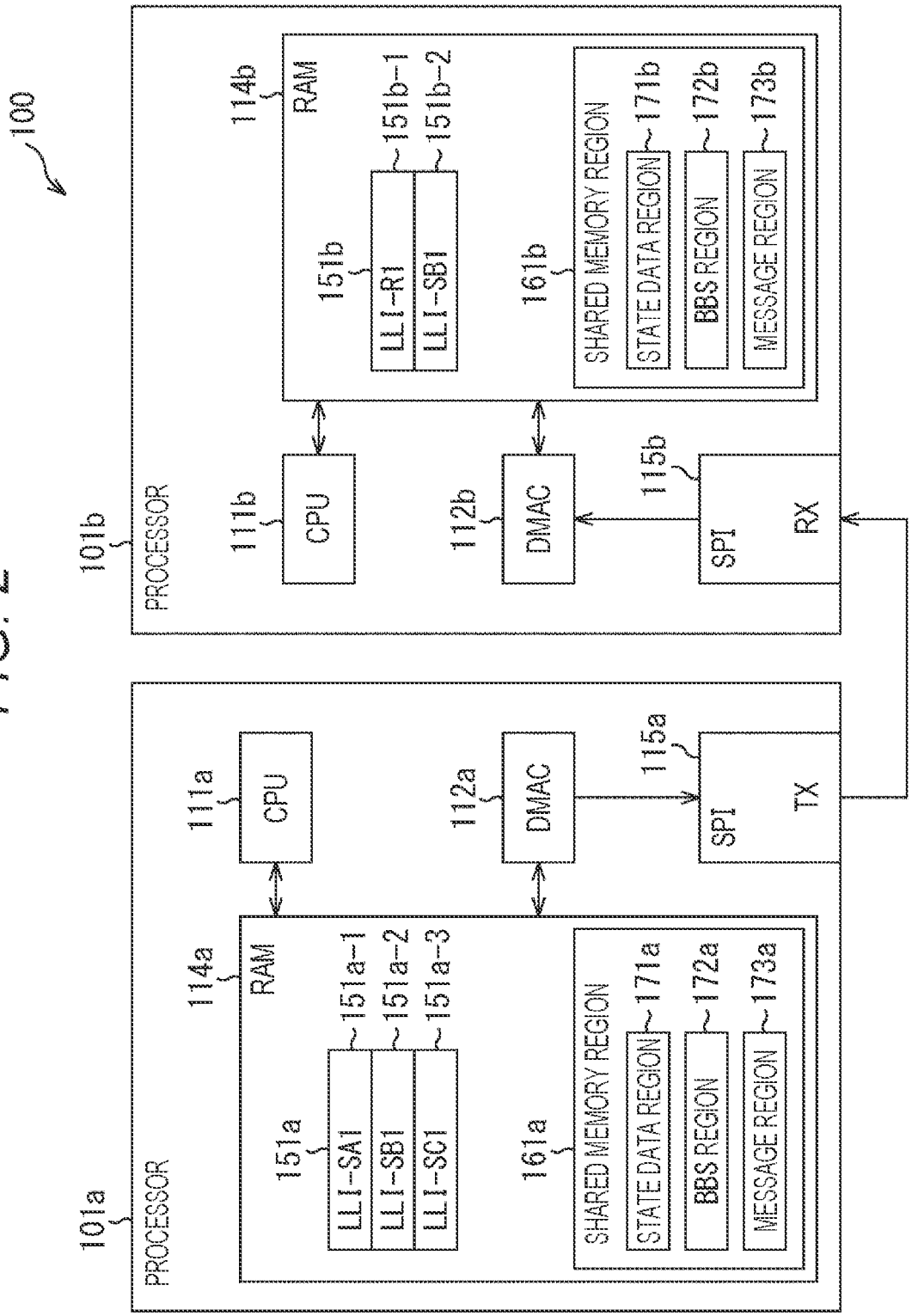
FIG. 2 is a block diagram illustrating a configuration example of a CPU and RAM of the information processing system to which the present technology is applied.

The RAM 114a temporarily stores a program or data necessary for processing by the processor 101a. Furthermore, as illustrated in FIG. 2, the RAM 114a is provided with the above-described shared memory region 161a.

The shared memory region 161a is a region sharing an address space with a shared memory region 161b of the processor 101b and is used to share data. That is, the shared memory region 161a and the shared memory region 161b are regions having the same address configuration, and are controlled by the DMAC 112a and the DMAC 112b so that the same data is stored in regions corresponding to each other. Note that, although regions in the shared memory region 161a and in the shared memory region 161b that store the same data are regions basically having the same address, the regions may not have the same address as long as a correspondence is established.

Furthermore, the shared memory region 161a is provided with a state data region 171a, a Bulletin Board System (BBS) region 172a, and a message region 173a.

The state data region 171a is a region for storing state data. The state data is data including state values indicating various states of the processor 101a and the processor 101b. By sharing the state data in real time, the processor 101a and the processor 101b can grasp states of each other in real time.

Although not illustrated, the state data region 171a is provided with an originating side region and a reference side region. In the originating side region, state data indicating a state of the processor 101a is stored. As will be described later, the state data stored in the originating side region is transmitted to the processor 101b and shared with the processor 101b. In the reference side region, state data received from the processor 101b and indicating a state of the processor 101b is stored. For example, the originating side region of the state data region 171a of the processor 101a and a reference side region of a state data region 171b of the processor 101b are provided in regions having the same address. Furthermore, the reference side region of the state data region 171a of the processor 101a and an originating side region of the state data region 171b of the processor 101b are provided in regions having the same address.

The BBS region 172a is a region for storing BBS data. The BBS data is data shared in a BBS function, and includes information (for example, a processing result or the like) output from each task executed in the processor 101a and the processor 101b. The BBS function is a function of disclosing the BBS data so that the BBS data can be referred to from another task.

Although not illustrated, the BBS region 172a is provided with an originating side region and a reference side region. In the originating side region, BBS data disclosed by a task of the processor 101a is stored. As will be described later, the BBS data stored in the originating side region is transmitted to the processor 101b and shared with the processor 101b. In the reference side region, the BBS data disclosed by the task of the processor 101b and received from the processor 101b is stored. For example, the originating side region of the BBS region 172a of the processor 101a and a reference side region of a BBS region 172b of the processor 101b are provided in regions having the same address. Furthermore, the reference side region of the BBS region 172a of the processor 101a and an originating side region of the BBS region 172b of the processor 101b are provided in regions having the same address.

The message region 173a is a region for storing a message. The message is data transmitted and received by designating a destination between each task executed in the processor 101a and the processor 101b. For example, there are a message requesting processing to a task of a transmission destination, a message responding to a received message, and the like.

Although not illustrated, the message region 173a is provided with a transmission side region and a reception side region. In the transmission side region, a message transmitted by the task of the processor 101a is stored. As will be described later, the message stored in the transmission side region is transmitted to the processor 101b and shared with the processor 101b. In the reception side region, the message received from the task of the processor 101b is stored. For example, the transmission side region of the message region 173a of the processor 101a and a reception side region of a message region 173b of the processor 101b are provided in regions having the same address. Furthermore, the reception side region of the message region 173a of the processor 101a and a transmission side region of the message region 173b of the processor 101b are provided in regions having the same address.

The SPI 115a can simultaneously perform bidirectional serial communication with the SPI 115b of the processor 101b by full-duplex communication. For example, the SPI 115a transmits data transferred from the RAM 114a by the DMAC 112a to the SPI 115b, and receives data transmitted from the SPI 115b.

Note that, hereinafter, description of the system bus 116a will be omitted in processing by the processor 101a. For example, in a case where the DMAC 112a transfers data, which is stored in the RAM 114a, to the SPI 115a via the system bus 116a, it is described that the DMAC 112a transfers data stored in the RAM 114a to the SPI 115a.

Similarly, hereinafter, description of a system bus 116b will be omitted in processing by the processor 101b.

<Data Transfer Processing>

Next, an example of data transfer processing executed by the information processing system 100 will be described with reference to FIGS. 3 to 11.

Note that, hereinafter, there will be described an example of a case where data is transferred from the processor 101a to the processor 101b, provided that the processor 101a is regarded as a transmission side, the processor 101b is regarded as a reception side.

Furthermore, there will be described an example of a case where the processor 101a, while repeatedly transmitting state data to the processor 101b, transmits BBS data and a message to the processor 101b as necessary.

<Processing by Processor 101a on Transmission Side>

First, processing by the processor 101a on the transmission side will be described with reference to FIGS. 3 to 8.

<Processing by CPU 111a>

Figure 3:
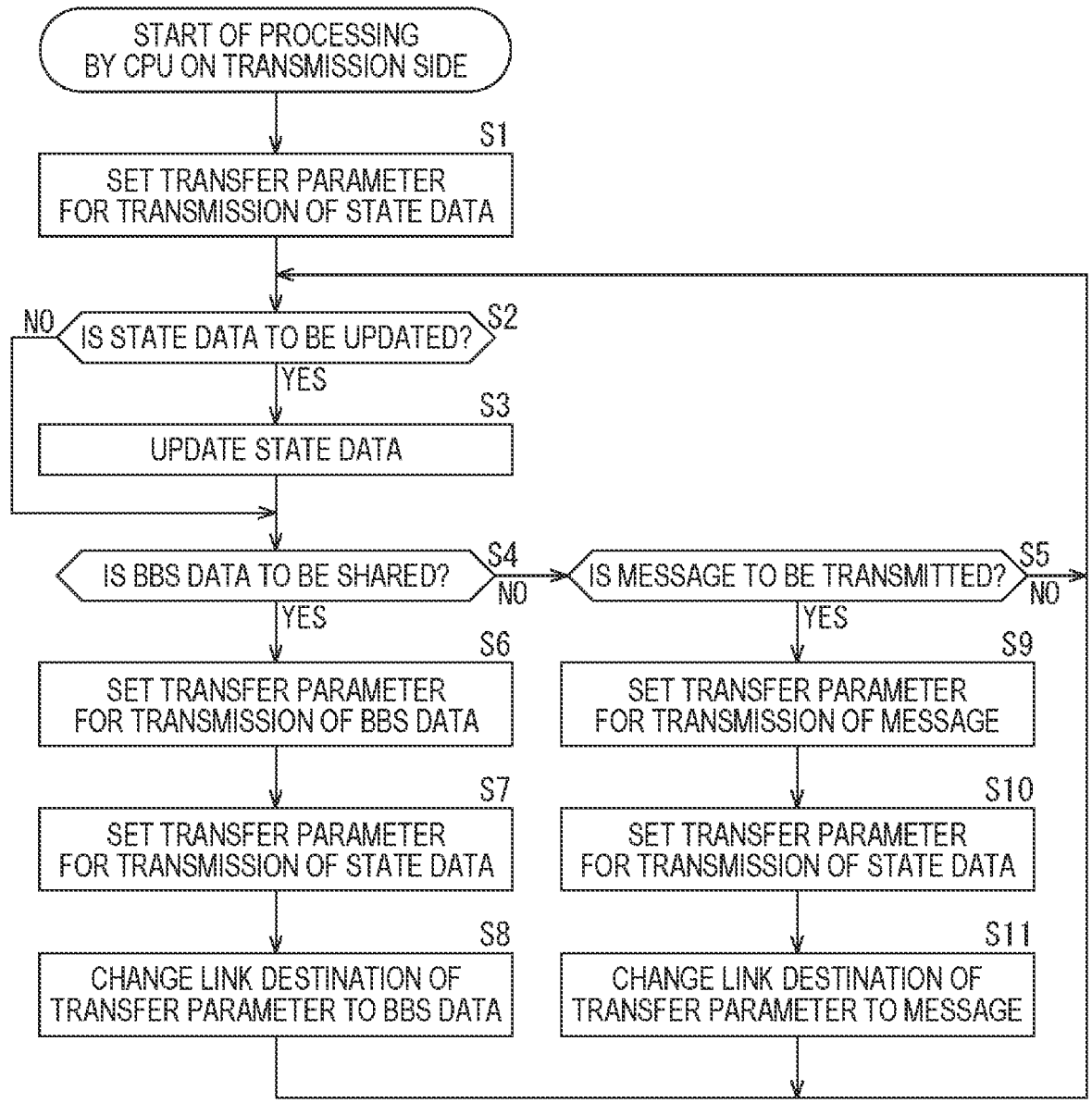
FIG. 3 is a flowchart for describing processing of a CPU of a transmission side processor.

First, processing by the CPU 111a of the processor 101a on the transmission side will be described with reference to the flowchart in FIG. 3.

This processing starts when power of an apparatus in which the information processing system 100 is incorporated is turned on, and ends when the power is turned off, for example.

In step S1, the CPU 111a sets a transfer parameter for transmission of the state data.

Specifically, the CPU 111a generates state data including a state value of the processor 101a, and stores the state data in the originating side region of the state data region 171a.

Furthermore, as illustrated in FIG. 2, the CPU 111a generates an LLI-SA1 to an LLI-SC1 and stores the LLI-SA1 to LLI-SC1 in LLI regions 151a-1 to 151a-3, respectively.

Note that 1 at an end of the LLI-SA1 is a serial number for distinguishing the same type of the LLI-SA by an order of generation or the like. Hereinafter, in a case where it is not particularly necessary to distinguish the same type of the LLI-SA, the number at the end is omitted and simply referred to as the LLI-SA. A similar applies to an LLI-SB and an LLI-SC.

Figure 4:
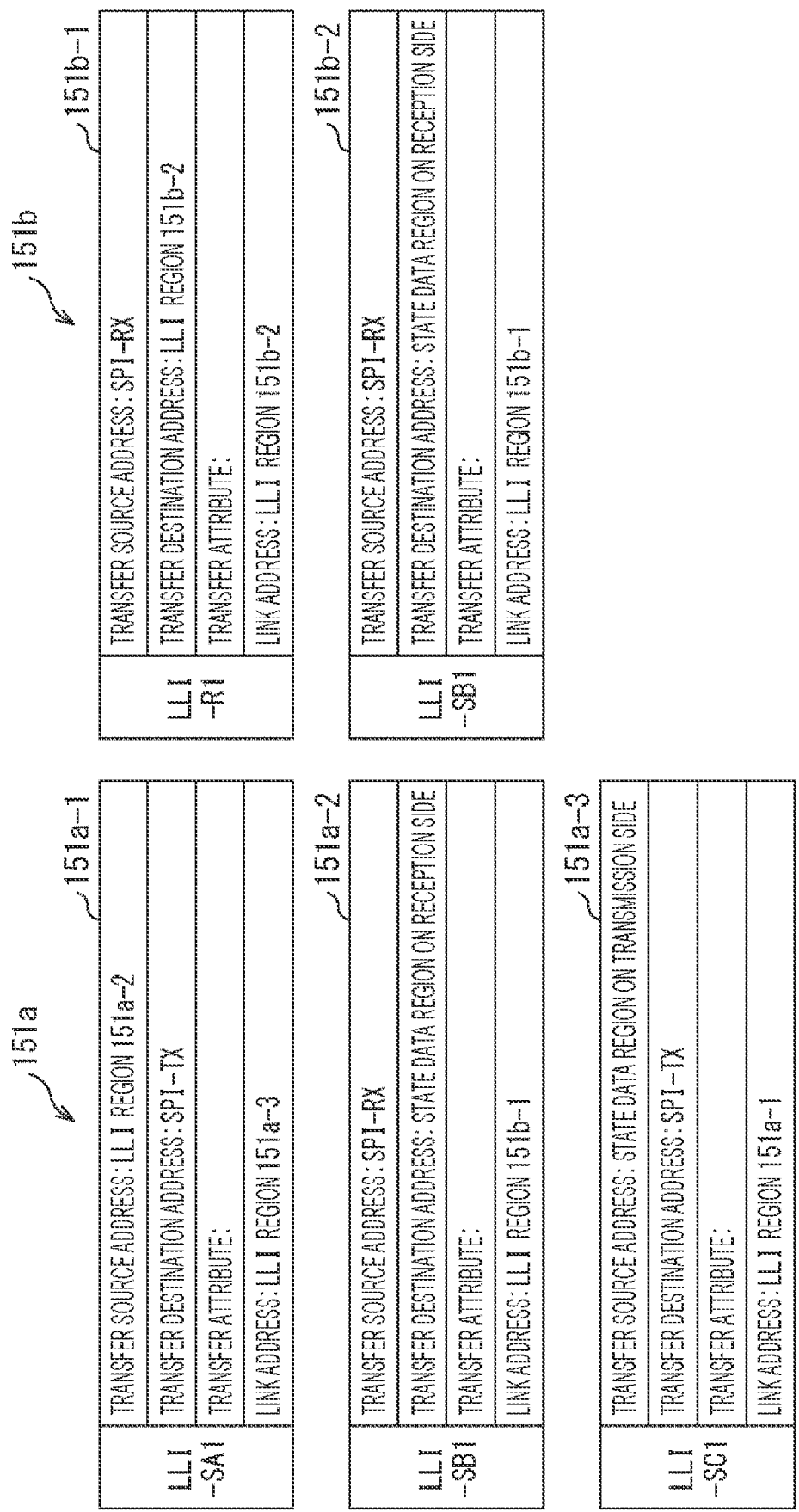
FIG. 4 is a diagram illustrating a configuration example of an LLI.

FIG. 4 illustrates a configuration example of the LLI-SA1 to LLI-SC1.

The LLI-SA1 includes a transfer parameter used for controlling transmission of the LLI-SB1. An address of an LLI region 151a-2 in which the LLI-SB1 is stored is set as the transfer source address. An address of a transmission channel TX, which is a region in the SPI 115a and is for storing data to be transmitted, is set as the transfer destination address. An address of the LLI region 151a-3 in which the LLI-SC1 is stored is set as the link address. That is, the LLI-SC1 is set as a link destination of the LLI-SA1.

The LLI-SB1 includes a transfer parameter used by the processor 101b on the reception side for controlling reception of the state data. An address of a reception channel RX, which is a region in the SPI 115b of the processor 101b and is for storing received data, is set as the transfer source address. An address of the reference side region of the state data region 171b of the processor 101b on the reception side is set as the transfer destination address, the reference side region corresponding to the originating side region of the state data region 171a of the processor 101a on the transmission side. An address of the LLI region 151b-1 in which an LLI-R1 of the processor 101b is stored is set as the link address. That is, the LLI-R1 is set as a link destination of the LLI-SB1.

Note that 1 at an end of the LLI-R1 is a serial number for distinguishing the same type of the LLI-R by an order of generation or the like. Hereinafter, in a case where it is not particularly necessary to distinguish the same type of the LLI-R, the number at the end is omitted and simply referred to as the LLI-R.

The LLI-SC1 includes a transfer parameter used for controlling transmission of the state data. An address of the originating side region of the state data region 171a of the processor 101a on the transmission side is set as the transfer source address. The address of the transmission channel TX of the SPI 115a is set as the transfer destination address. An address of the LLI region 151a-1 in which the LLI-SA1 is stored is set as the link address. That is, the LLI-SA1 is set as a link destination of the LLI-SC1. Therefore, the LLI-SA1 and the LLI-SC1 are linked to each other.

In step S2, the CPU 111a determines whether or not to update the state data. For example, in a case where the state of the processor 101a is updated, the CPU 111a determines to update the state data, and the processing proceeds to step S3.

In step S3, the CPU 111a updates the state data. Specifically, the CPU 111a generates state data including an updated state value of the processor 101a, and stores the state data in the originating side region of the state data region 171a.

Thereafter, the processing proceeds to step S4.

Meanwhile, in step S2, in a case where the state of the processor 101a is not updated, the CPU 111a determines not to update the state data, the processing in step S3 is skipped, and the processing proceeds to step S4.

In step S4, the CPU 111a determines whether or not to share the BBS data. In a case where it is determined not to share the BBS data, the processing proceeds to step S5.

In step S5, the CPU 111a determines whether or not to transmit a message. In a case where it is determined not to transmit the message, the processing returns to step S2.

Thereafter, the processing returns to step 2, and the processing in steps S2 to S5 is repeatedly executed until it is determined in step S4 that the BBS data is shared or it is determined in step S5 that the message is transmitted.

Figure 5:
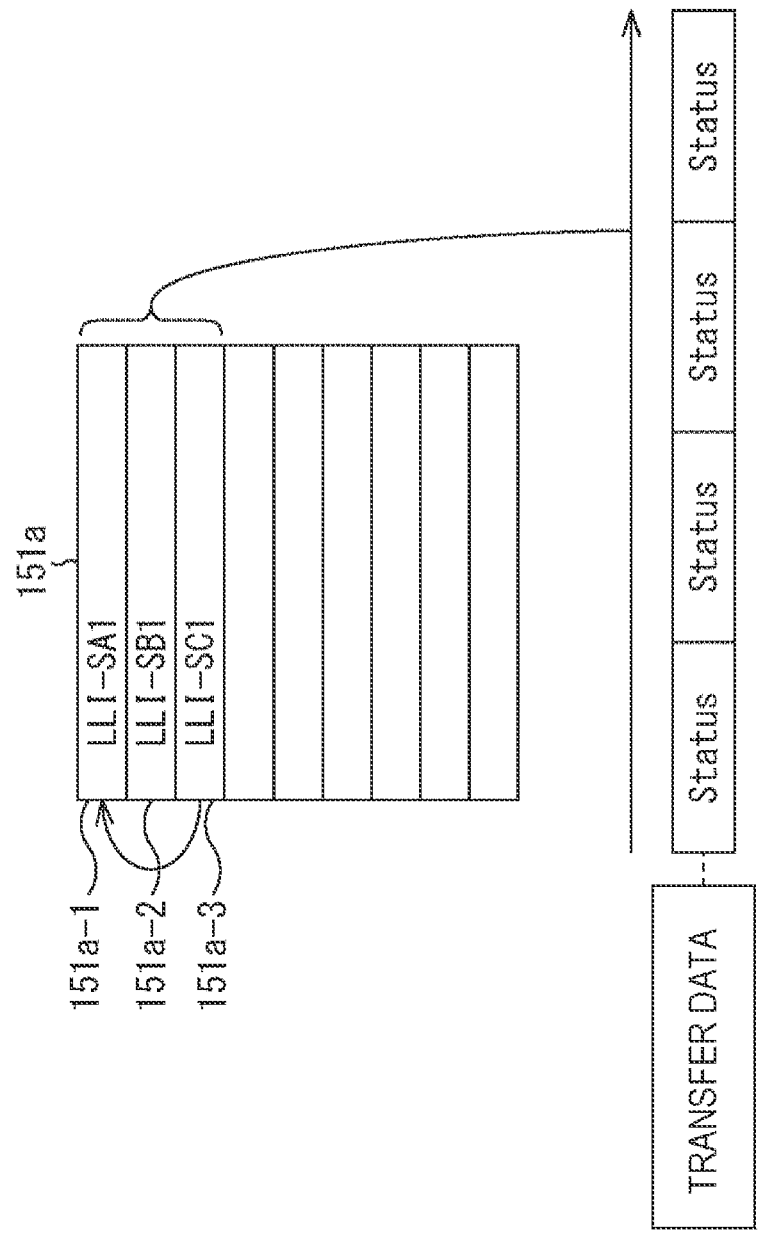
FIG. 5 is a diagram for describing processing of transmitting state data.

With this arrangement, on the basis of the LLI-SA1 to LLI-SC1 set as the LLI region 151a, control of transmission of the LLI-SB1 from the processor 101a to the processor 101b and control of transmission of the state data from the processor 101a to the processor 101b are alternately repeated. Then, as illustrated in FIG. 5, the state data (Status) is repeatedly transmitted from the processor 101a to the processor 101b.

Figure 6:
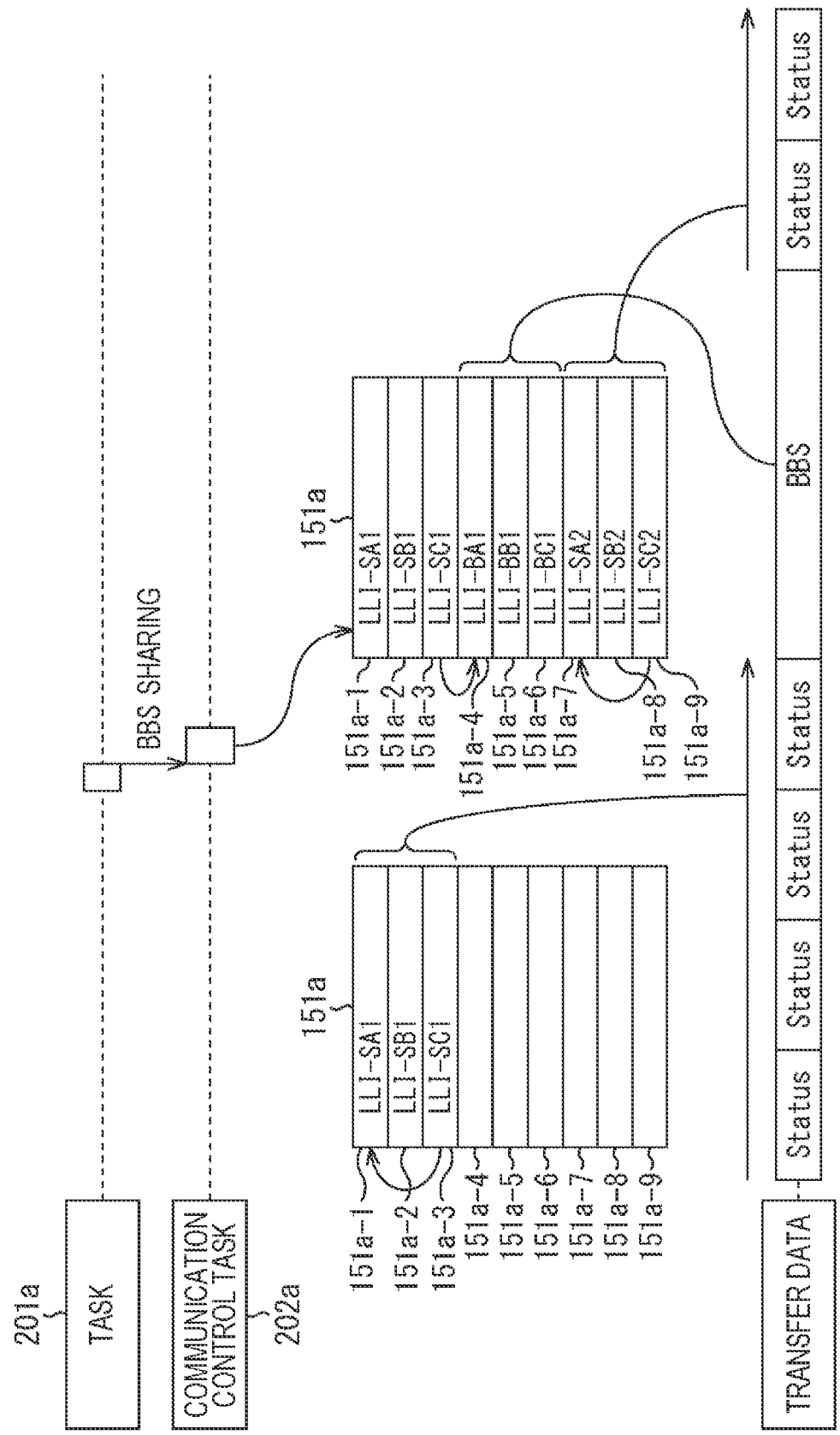
FIG. 6 is a diagram for describing processing of transmitting BBS data.

Meanwhile, in step S4, for example, as illustrated in FIG. 6, in a case where the CPU 111a determines that a task 201a under execution shares the BBS data, the processing proceeds to step S6.

In step S6, the CPU 111a sets a transfer parameter for transmission of the BBS data.

For example, the CPU 111a stores the shared BBS data in the originating side region of the BBS region 172a.

Furthermore, as illustrated in FIG. 6, the CPU 111a executes a communication control task 202a called from the task 201a to generate an LLI-BA1 to an LLI-BC1, and stores the LLI-BA1 to LLI-BC1 in LLI regions 151a-4 to 151a-6.

Note that 1 at an end of the LLI-BA1 is a serial number for distinguishing the same type of the LLI-BA by an order of generation or the like. Hereinafter, in a case where it is not particularly necessary to distinguish the same type of the LLI-BA, the number at the end is omitted and simply referred to as the LLI-BA. A similar applies to an LLI-BB and an LLI-BC.

The LLI-BA1 includes a transfer parameter used for controlling transmission of the LLI-BB1. An address of the LLI region 151a-5 in which the LLI-BB1 is stored is set as the transfer source address. The address of the transmission channel TX of the SPI 115a is set as the transfer destination address. An address of the LLI region 151a-6 in which the LLI-BC1 is stored is set as the link address. That is, the LLI-BC1 is set as a link destination of the LLI-BA1.

The LLI-BB1 includes a transfer parameter used by the processor 101b on the reception side for controlling reception of the BBS data. Specifically, the address of the reception channel RX of the SPI 115b of the processor 101b is set as the transfer source address. The address of the reference side region of the BBS region 172b of the processor 101b on the reception side is set as the transfer destination address. An address of the LLI region 151b-1 in which an LLI-R1 of the processor 101b is stored is set as the link address. That is, the LLI-R1 is set as a link destination of the LLI-BB1.

The LLI-BC1 includes a transfer parameter used for controlling transmission of the BBS data. Specifically, an address of the originating side region of the BBS region 172a of the processor 101a on the transmission side is set as the transfer source address. The address of the transmission channel TX of the SPI 115a is set as the transfer destination address. An address of an LLI region 151a-7 next to the LLI region 151a-6 in which the LLI-BC1 is stored is set as the link address.

In step S7, the CPU 111a sets a transfer parameter for transmission of the state data. That is, the CPU 111a sets a transfer parameter for transmission of the state data after transmission of the BBS data. For example, as illustrated in FIG. 6, the CPU 111a generates an LLI-SA2 to an LLI-SC2 similar to the LLI-SA1 to LLI-SC1, and stores the LLI-SA2 to LLI-SC2 in LLI regions 151a-7 to 151a-9, respectively.

In step S8, the CPU 111a changes a link destination of the transfer parameter to the BBS data. Specifically, the CPU 111a rewrites a link address of the LLI-SC1 stored in the LLI region 151a-3 from the address of the LLI region 151a-1 to the address of the LLI region 151a-4. With this arrangement, the link destination of the LLI-SC1 is changed from the LLI-SA1 to the LLI-BA1.

Thereafter, the processing returns to step S2, and processing in and after step S2 is executed. With this arrangement, after the transmission of the BBS data is set, the update of the state data resumes.

Figure 7:
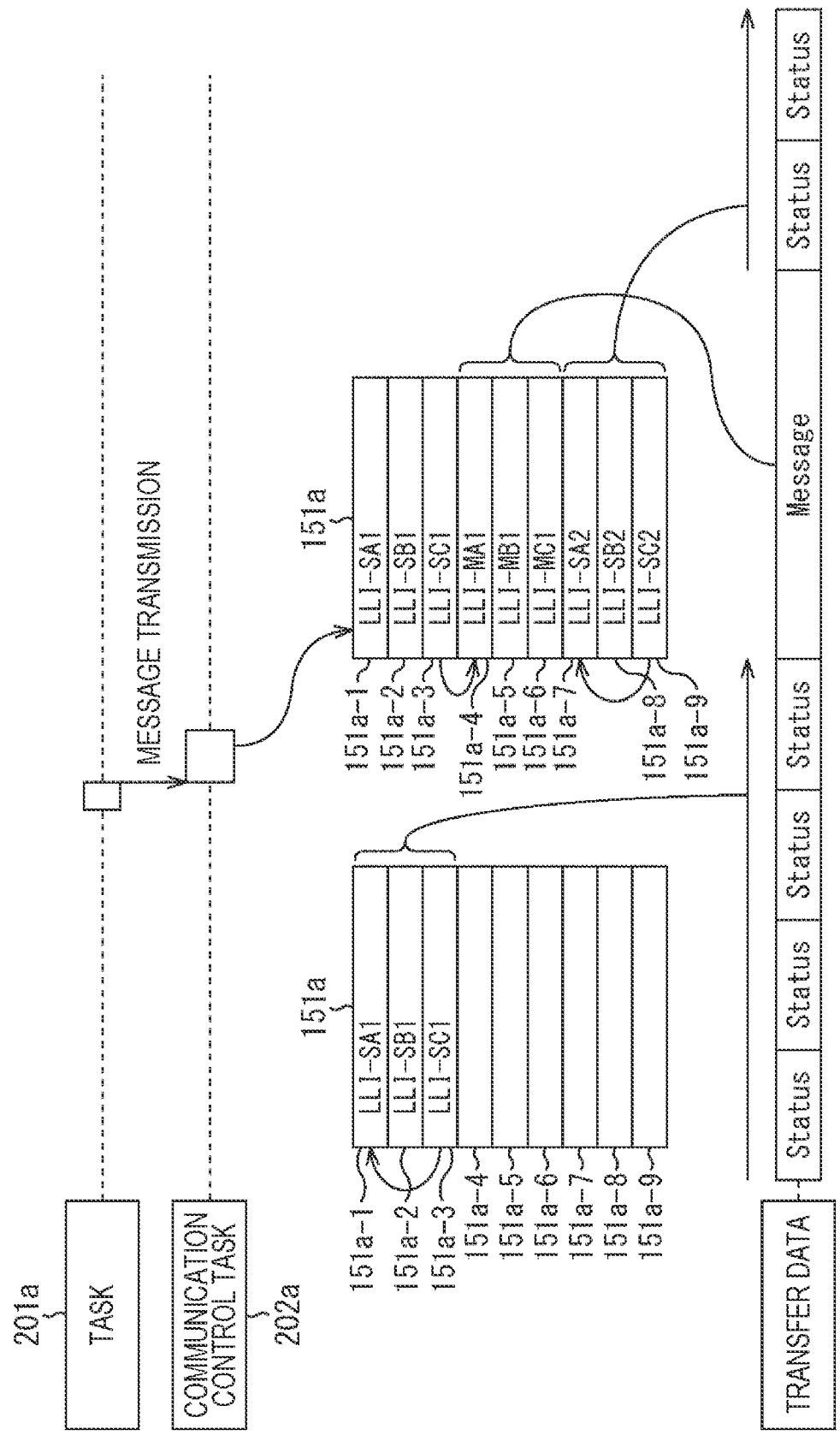
FIG. 7 is a diagram for describing processing of transmitting a message.

Meanwhile, in step S5, for example, as illustrated in FIG. 7, in a case where the CPU 111a determines that the task 201a under execution is to transmit a message to another task under execution in the processor 101b, the processing proceeds to step S9.

In step S9, the CPU 111a sets a transfer parameter for transmission of the message.

For example, in a transmission side region of the message region 173a, the CPU 111a stores a message to be transmitted.

Furthermore, for example, as illustrated in FIG. 7, the CPU 111a executes the communication control task 202a called from the task 201a to generate an LLI-MA1 to LLI-MC1, and stores the LLI-MA1 to LLI-MC1 in the LLI regions 151a-4 to 151a-6.

Note that 1 at an end of the LLI-MA1 is a serial number for distinguishing the same type of the LLI-MA by an order of generation or the like. Hereinafter, in a case where it is not particularly necessary to distinguish the same type of the LLI-MA, the number at the end is omitted and simply referred to as the LLI-MA. A similar applies to an LLI-MB and an LLI-MC.

The LLI-MA1 includes a transfer parameter used for controlling transmission of the LLI-MB1. An address of the LLI region 151a-5 in which the LLI-MB1 is stored is set as the transfer source address. The address of the transmission channel TX of the SPI 115a is set as the transfer destination address. The address of the LLI region 151a-6 in which the LLI-MC1 is stored is set as the link address. That is, the LLI-MC1 is set as a link destination of the LLI-MA1.

The LLI-MB1 includes a transfer parameter used by the processor 101b on the reception side for controlling reception of a message. The address of the reception channel RX of the SPI 115b of the processor 101b is set as the transfer source address. The address of the reception side region of the message region 173b of the processor 101b on the reception side is set as the transfer destination address. An address of the LLI region 151b-1 in which an LLI-R1 of the processor 101b is stored is set as the link address. That is, the LLI-R1 is set as a link destination of the LLI-MB1. Transfer completion notification control information for making an interrupt notification at a time of completion of transfer of data (message) based on the LLI-MB1 is set as the attribute.

The LLI-MC1 includes a transfer parameter used for controlling transmission of the message. An address of the transmission side region of the message region 173a of the processor 101a on the transmission side is set as the transfer source address. The address of the transmission channel TX of the SPI 115a is set as the transfer destination address. The address of the LLI region 151a-7 next to the LLI region 151a-6 in which the LLI-MC1 is stored is set as the link address.

In step S10, a transfer parameter for transmission of the state data is set similarly to the processing in step S7. That is, a transfer parameter for transmission of the state data after transmission of the message is set. For example, as illustrated in FIG. 7, the CPU 111a generates an LLI-SA2 to an LLI-SC2 similar to the LLI-SA1 to LLI-SC1, and stores the LLI-SA2 to LLI-SC2 in the LLI regions 151a-7 to 151a-9, respectively.

In step S11, the CPU 111a changes a link destination of the transfer parameter to the message. Specifically, the CPU 111a rewrites a link address of the LLI-SC1 stored in the LLI region 151a-3 from the address of the LLI region 151a-1 to the address of the LLI region 151a-4. With this arrangement, the link destination of the LLI-SC1 is changed from the LLI-SA1 to the LLI-MA1.

Thereafter, the processing returns to step S2, and processing in and after step S2 is executed. With this arrangement, for example, after the transmission of the message is set, the update of the state data resumes.

<Processing by DMAC 112a>

Next, processing by the DMAC 112a of the processor 101a on the transmission side will be described with reference to the flowchart in FIG. 8.

This processing starts when power of an apparatus in which the information processing system 100 is incorporated is turned on, and ends when the power is turned off, for example.

In step S31, the DMAC 112a reads a transfer parameter for transmission of the transfer parameter.

For example, in the processing in a first step S31, the DMAC 112a reads the LLI-SA1 from the LLI region 151a-1 and stores the LLI-SA1 in the built-in register.

In step S32, the DMAC 112a transmits a transfer parameter for reception of the transfer parameter.

For example, in the processing in a first step S32, the DMAC 112a reads the LLI-SB1 from the LLI region 151a-1 on the basis of the LLI-SA1, and stores the LLI-SB1 in the transmission channel TX of the SPI 115a.

The SPI 115a transmits the LLI-SB1 stored in the transmission channel TX to the processor 101b.

In contrast, the processor 101b on the reception side receives the LLI-SB1 in step S121 in FIG. 10 described later.

In step S33, the DMAC 112a reads a transfer parameter for transmission of the transfer data.

For example, in the processing in a first step S33, the DMAC 112a reads the LLI-SC1 from the LLI region 151a-3 on the basis of a link address of the LLI-SA1, and stores the LLI-SC1 in the built-in register.

In step S34, the DMAC 112a transmits the transfer data.

For example, in the processing in a first step S34, the DMAC 112a reads the state data from the originating side region of the state data region 171a on the basis of the LLI-SC1, and stores the state data in the transmission channel TX of the SPI 115a.

The SPI 115a transmits the state data stored in the transmission channel TX to the processor 101b.

In contrast, the processor 101b on the reception side receives the state data in step S123 in FIG. 10 described later.

Thereafter, the processing returns to step S31, and the processing in steps S31 to S34 is repeatedly executed. With this arrangement, for example, in a case where the link destination of the transfer parameter is not changed in step S8 or step S11 in FIG. 3 described above, the state data (Status) is repeatedly transmitted from the processor 101a to the processor 101b by the above-described processing as illustrated in FIG. 5.

Meanwhile, in a case where the link destination of the transfer parameter is changed to the BBS data in step S8 described above, the BBS data is transmitted.

Specifically, in step S31, the DMAC 112a reads the LLI-BA1 from the LLI region 151a-4 on the basis of the link address of the LLI-SC1, and stores the LLI-BA1 in the built-in register.

In step S32, the DMAC 112a reads the LLI-BB1 from the LLI region 151a-5 on the basis of the LLI-BA1, and stores the LLI-BB1 in the transmission channel TX of the SPI 115a.

The SPI 115a transmits the LLI-BB1 stored in the transmission channel TX to the processor 101b.

In contrast, the processor 101b on the reception side receives the LLI-BB1 in step S122 in FIG. 10 described later.

In step S33, the DMAC 112a reads the LLI-BC1 from the LLI region 151a-6 on the basis of a link address of the LLI-BA1, and stores the LLI-BC1 in the built-in register.

In step S34, the DMAC 112a reads the BBS data from the originating side region of the BBS region 172a on the basis of the LLI-BC1, and stores the BBS data in the transmission channel TX of the SPI 115a.

The SPI 115a transmits the BBS data stored in the transmission channel TX to the processor 101b.

With this arrangement, as illustrated in FIG. 6, the transmission of the state data (Status) from the processor 101a to the processor 101b is interrupted, and the BBS data is transmitted.

In contrast, the processor 101b on the reception side receives the BBS data in step S123 in FIG. 10 described later.

Thereafter, the processing returns to step S31, the processing in and after step S31 is executed, and the transmission of the state data resumes on the basis of the LLI-SA2 to LLI-SC2.

Meanwhile, in a case where the link destination of the transfer parameter is changed to the message in step S11 described above, the message is transmitted.

Specifically, in step S31, the DMAC 112a reads the LLI-MA1 from the LLI region 151a-4 on the basis of the link address of the LLI-SC1, and stores the LLI-MA1 in the built-in register.

In step S32, the DMAC 112a reads the LLI-MB1 from the LLI region 151a-4 on the basis of the LLI-MA1, and stores the LLI-MB1 in the transmission channel TX of the SPI 115a.

The SPI 115a transmits the LLI-MB1 stored in the transmission channel TX to the processor 101b.

In contrast, the processor 101b on the reception side receives the LLI-MB1 in step S122 in FIG. 10 described later.

In step S33, the DMAC 112a reads the LLI-MC1 from the LLI region 151a-6 on the basis of a link address of the LLI-MA1, and stores the LLI-MC1 in the built-in register.

In step S34, the DMAC 112a reads the message from the transmission side region of the message region 173a on the basis of the LLI-MC1, and stores the message in the transmission channel TX of the SPI 115a.

The SPI 115a transmits the message stored in the transmission channel TX to the processor 101b.

With this arrangement, as illustrated in FIG. 7, the transmission of the state data (Status) from the processor 101a to the processor 101b is interrupted, and the message is transmitted.

In contrast, the processor 101b on the reception side receives the message in step S123 in FIG. 10 described later.

Thereafter, the processing returns to step S31, the processing in and after step S31 is executed, and the transmission of the state data resumes on the basis of the LLI-SA2 to LLI-SC2.

<Processing by Processor 101b on Reception Side>

Next, processing executed by the processor 101b on the reception side, corresponding to the processing by the processor 101a on the transmission side in FIGS. 3 to 8, will be described with reference to FIGS. 9 to 11.

<Initial Processing by CPU 111b>

First, initial processing executed by a CPU 111b of the processor 101b on the reception side will be described with reference to the flowchart in FIG. 9.

This processing starts, for example, when power of an apparatus in which the information processing system 100 is incorporated is turned on.

In step S101, the processor 101b sets a transfer parameter for reception of the transfer parameter. Specifically, as illustrated in FIG. 2, the CPU 111b generates the LLI-R1 and stores the LLI-R1 in the LLI region 151b-1.

The LLI-R1 includes a transfer parameter used for controlling reception of the transfer parameter. Specifically, as illustrated in FIG. 4, the address of the reception channel RX of the SPI 115b is set as the transfer source address. An address of an LLI region 151b-2 next to the LLI region 151b-1 in which the LLI-R1 is stored is set as the transfer destination address. The address of the LLI region 151b-2 is set as the link address. That is, the LLI to be stored in the LLI region 151b-2 is set as a link destination of the LLI-R1.

Thereafter, the processing ends.

<Processing by DMAC 112b>

Next, processing executed by the DMAC 112b of the processor 101b on the reception side will be described with reference to the flowchart in FIG. 10.

This processing starts when power of an apparatus in which the information processing system 100 is incorporated is turned on, and ends when the power is turned off, for example.

In step S121, the DMAC 112b receives a transfer parameter for reception of the transfer data.

The DMAC 112b reads the LLI-R1 from the LLI region 151b-1, and sets LLI-R1 in the internal register. With this arrangement, the DMAC 112b enters a reception waiting state. That is, the DMAC 112b waits for transmission of the LLI-SB1, LLI-BB1, or LLI-MB1 to the reception channel RX of the SPI 115b.

Figure 8:
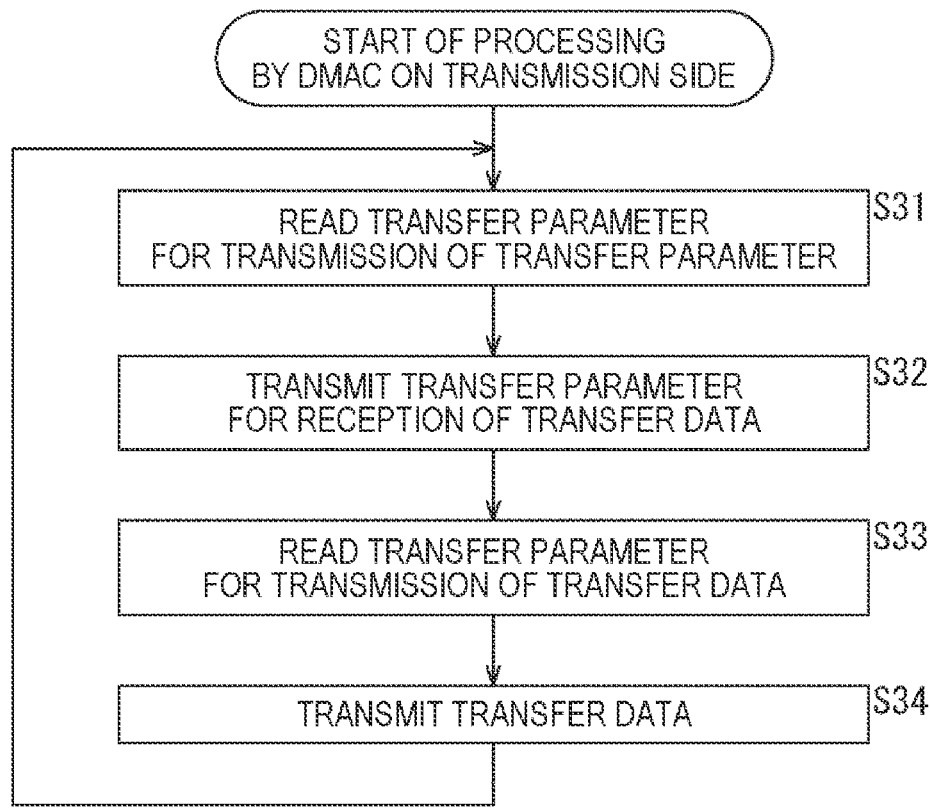
FIG. 8 is a flowchart for describing processing of a DMAC of the transmission side processor.
Figure 9:
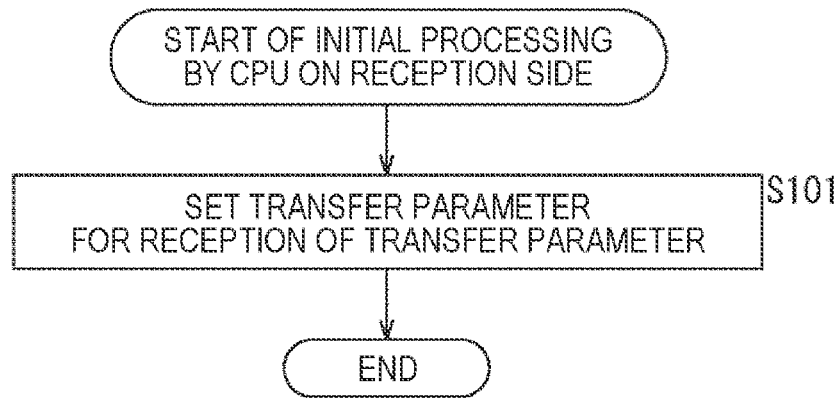
FIG. 9 is a flowchart for describing initial processing of a CPU of a reception side processor.

The SPI 115b receives the LLI-SB1, LLI-BB1, or LLI-MB1 transmitted in the processing in step S32 in FIG. 8 from the processor 101a and stores the LLI-SB1, LLI-BB1, or LLI-MB1 in the reception channel RX.

In step S122, the processor 101b sets a transfer parameter for reception of the transfer data.

Specifically, the DMAC 112b reads the LLI-SB1, LLI-BB1, or LLI-MB1 from the reception channel RX of the SPI 115*b* on the basis of the LLI-R1, and stores the LLI-SB1, LLI-BB1, or LLI-MB1 in the LLI region 151*b*-2.

Note that FIGS. 2 and 4 illustrate an example in which the LLI-SB1 is stored in the LLI region 151*b*-2.

As described above, the address of the LLI region 151*b*-2 is set as the link address of the LLI-R1. Furthermore, as described above, the address of the LLI region 151*b*-1 is set in the link addresses of the LLI-SB1, LLI-BB1, and LLI-MB1. Therefore, the LLI-R1 and the LLI-SB1, LLI-BB1, or LLI-MB1 are linked to each other.

In step S123, the processor 101*b* receives the transfer data.

Specifically, the DMAC 112*b* reads the LLI-SB1, LLI-BB1, or LLI-MB1 from the LLI region 151*b*-2, and stores the LLI-SB1, LLI-BB1, or LLI-MB1 in the internal register. With this arrangement, the DMAC 112*b* enters a reception waiting state. That is, the DMAC 112*b* waits for the state data, BBS data, or message to be transmitted to the reception channel RX of the SPI 115*b*.

The SPI 115*b* receives, from the processor 101*a*, the state data, BBS data, or message transmitted in the processing in step S34 in FIG. 8, and stores the state data, BBS data, or message in the reception channel RX.

The transfer data stored in the reception channel RX is transferred to the shared memory region 161*b* by the DMAC 112*b*.

For example, in a case where the state data is received, the DMAC 112*b* reads the transfer data from the reception channel RX of the SPI 115*b* on the basis of the LLI-SB1, and stores the transfer data in the reference side region of the state data region 171*b* of the shared memory region 161*b*.

In a case where the BBS data is received, the DMAC 112*b* reads the BBS data from the reception channel RX of the SPI 115*b* on the basis of the LLI-BB1, and stores the BBS data in the reference side region of the BBS region 172*b* of the shared memory region 161*b*.

In a case where the message is received, the DMAC 112*b* reads the message from the reception channel RX of the SPI 115*b* on the basis of the LLI-MB1, and stores the message in the reception side region of the message region 173*b* of the shared memory region 161*b*.

In step S124, the DMAC 112*b* determines whether or not to make a transfer completion notification. In a case where the DMAC 112*b* transfers the message from the SPI 115*b* to the message region 173*b* on the basis of the LLI-MB1, the DMAC 112*b* determines, on the basis of the transfer completion notification control information set for the attribute of the LLI-MB1, to make a transfer completion notification, and the processing proceeds to step S125.

In step S125, the DAMC 112*b* makes a transfer completion notification. Specifically, the DAMC 112*b* makes an interrupt notification of message transfer completion to the CPU 111*b*.

Thereafter, the processing returns to step S121, and the processing in steps S121 to S125 is repeatedly executed. That is, processing of receiving a transfer parameter for reception of any one of the state data, the BBS data, or the message from the processor 101*a* on a transmission side, receiving the state data, the BBS data, or the message by using the received transfer parameter, and storing the state data, the BBS data, or the message in a predetermined region of the shared memory region 161*b* is repeatedly executed.

Meanwhile, in a case where transfer of the state data from the SPI 115*b* to the state data region 171*a* on the basis of the LLI-SB1, the transfer completion notification control information is not set for the attribute of the LLI-SB1, and therefore, the DMAC 112*b* determines not to make the transfer completion notification in step S124, and the processing returns to step S121. Similarly, in a case where transfer of the BBS data from the SPI 115*b* to the BBS region 172*b* on the basis of the LLI-BB1, the transfer completion notification control information is not set for the attribute of the LLI-BB1, and therefore, the DMAC 112*b* determines not to make the transfer completion notification, and the processing returns to step S121.

Thereafter, the processing in steps S121 to S125 is repeatedly executed.

<Interrupt Processing>

Next, transfer data reception processing executed by the CPU 111*b*, corresponding to the processing by the DMAC 112*b* in FIG. 10, will be described with reference to the flowchart in FIG. 11.

Figure 10:
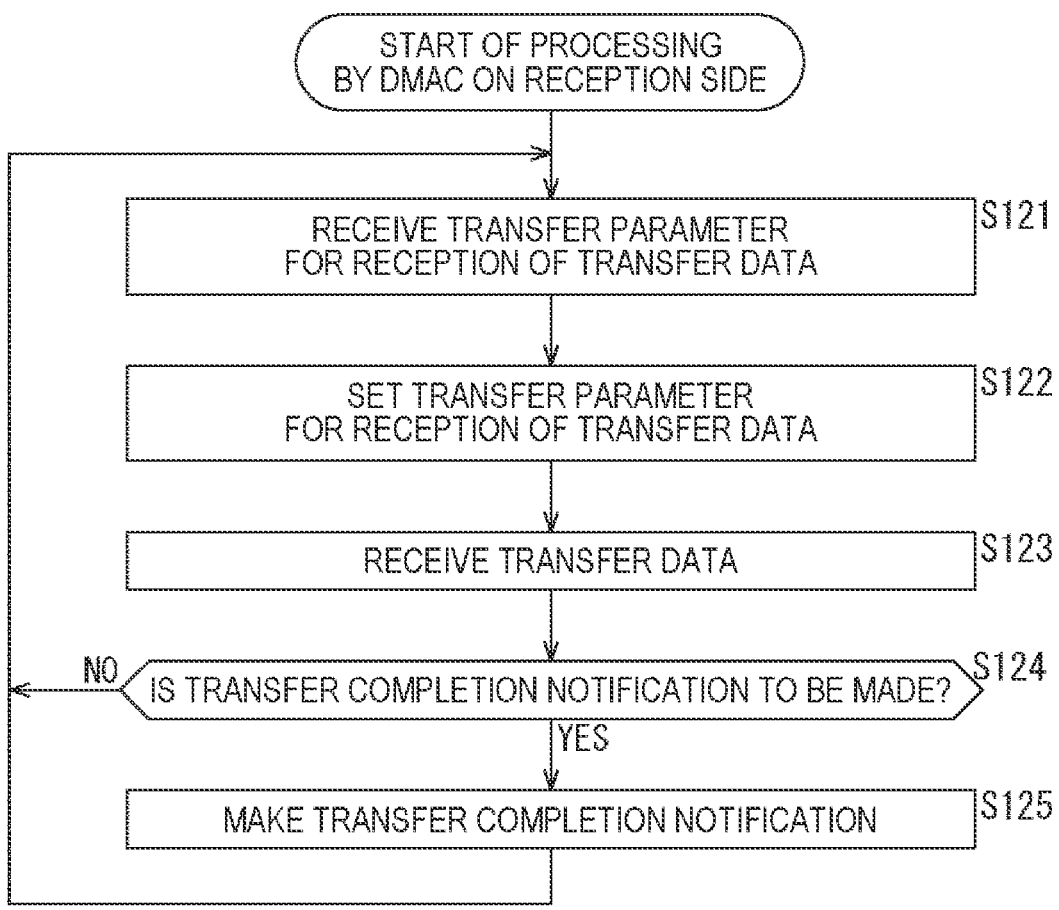
FIG. 10 is a flowchart for describing processing of a DMAC of the reception side processor.
Figure 11:
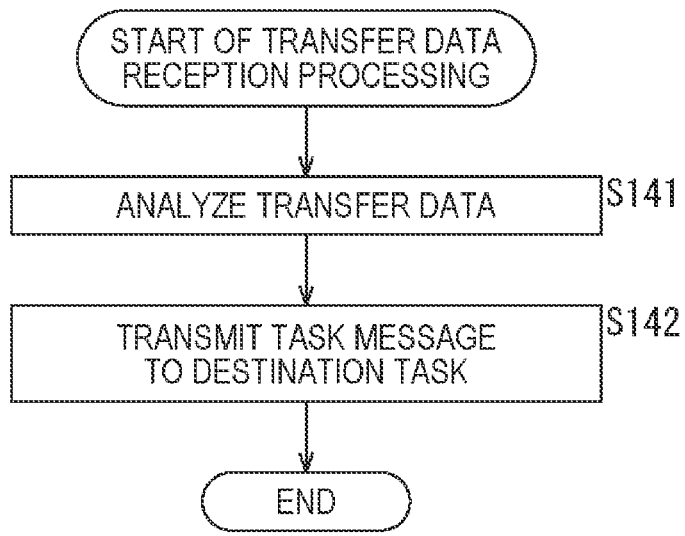
FIG. 11 is a flowchart for describing transfer data reception processing by the CPU of the reception side processor.

This processing is started in step S125 in FIG. 10 when the DAMC 112*b* makes an interrupt notification of message transfer completion to the CPU 111*b*.

In step S141, the CPU 111*b* analyzes the transfer data. Specifically, the CPU 111*b* analyzes the message, which is transfer data stored in the reception side region of the message region 173*b*, thereby designating a destination task of the message and generating a task message to be transmitted to the destination task.

In step S142, the CPU 111*b* transmits a task message to the destination task.

Thereafter, the transfer data reception processing ends.

As described above, state data, BBS data, and a message can be transferred from the processor 101*a* to the processor 101*b*.

Furthermore, sharing of the address space between the shared memory region 161*a* of the processor 101*a* and the shared memory region 161*b* of the processor 101*b* is achieved by a communication control algorithm. Therefore, load on the transmission side and on the reception side is reduced as compared with a case of using a mechanism of data transmission and reception by protocol communication.

For example, the CPU 111*a* of the processor 101*a* on the transmission side is only required to set the LLI and rewrite the link address of the LLI, and does not need to perform device control for transfer start, transfer end, or the like, on the DMAC 112*a* and the SPI 115*a*. Therefore, the processing by the CPU 111*a* is reduced.

For example, the CPU 111*b* of the processor 101*b* on the reception side is only required to set the LLI-R1 in the LLI region 151*b*, and does not need to perform any other LLI setting. Furthermore, the CPU 111*b* does not need to perform device control for transfer start, transfer end, or the like, on the DMAC 112*b* and the SPI 115*b*. Therefore, the processing by the CPU 111*b* is reduced.

Moreover, because a transfer parameter is achieved by the linked list structure, for example, state data stored in the state data region 171*a* can be repeatedly transferred even if the CPU 111*a* is not interposed. Furthermore, it is possible to continuously transfer two or more types of data among the state data, BBS data, and message stored in the shared memory region 161*a*. Furthermore, content of the data to be transferred can be changed only by the CPU 111*a* changing a link destination of the LLI.

Note that, although the processing of data transfer from the processor 101*a* to the processor 101*b* has been described above, data transfer from the processor 101*b* to the processor 101*a* can also be achieved by similar processing.

Furthermore, because the SPI 115*a* and the SPI 115*b* can perform full-duplex communication, data transfer from the processor 101*a* to the processor 101*b* and data transfer from the processor 101*b* to the processor 101*a* can be executed asynchronously and in parallel.

<Specific Example of Data Transfer Processing>

Next, a specific example of the above-described data transfer processing will be described with reference to the sequence diagram in FIG. 12.

Figure 12:
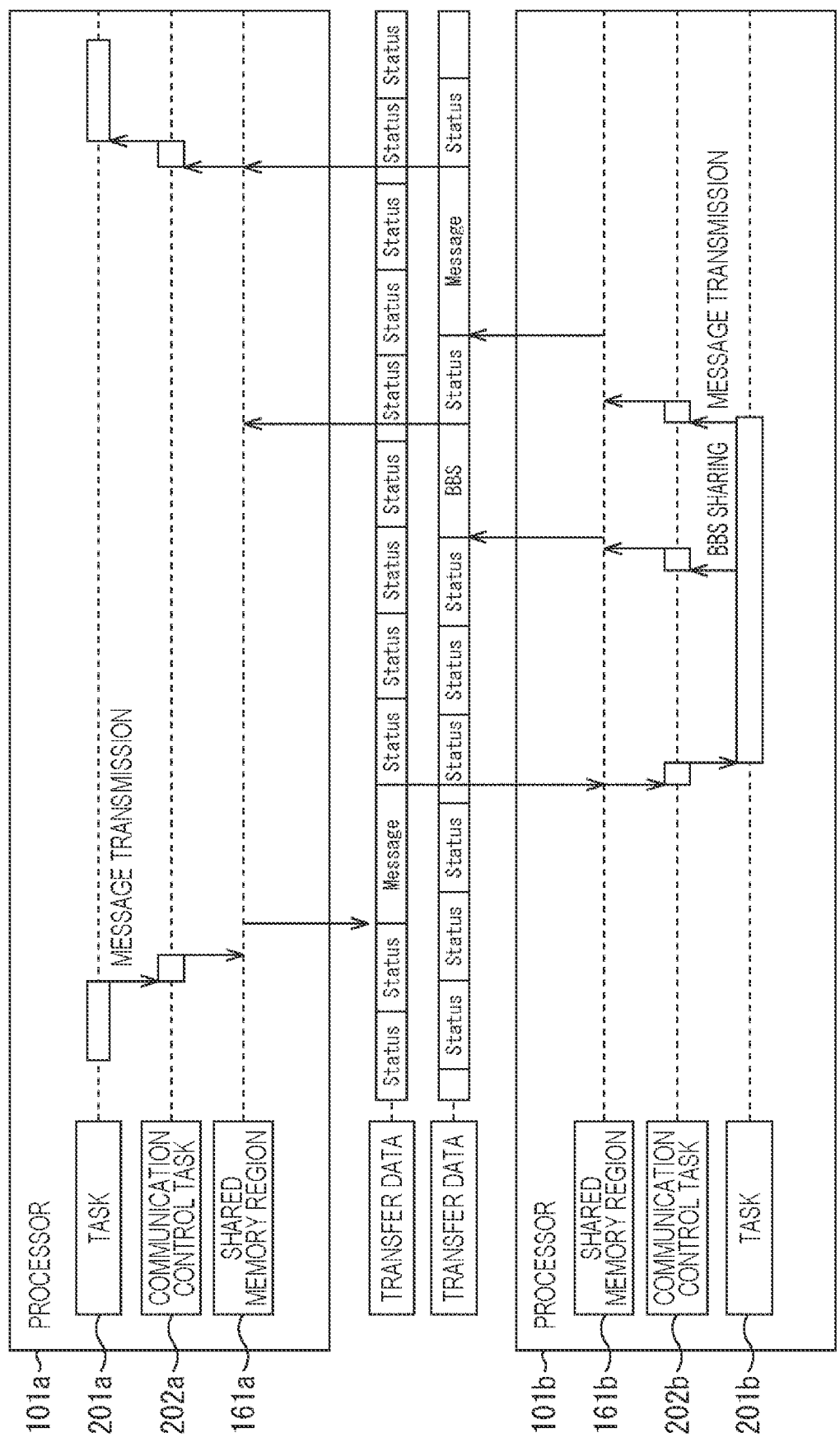
FIG. 12 is a sequence diagram illustrating a specific example of data transfer processing.

FIG. 12 illustrates a sequence diagram of a case where a processing request message is transmitted from the task 201*a* of the processor 101*a* to a task 201*b* of the processor 101*b*, a processing result of the task 201*b* is shared by the BBS, and a processing response message is returned from the task 201*b* to the task 201*a*.

Note that it is assumed that, by the above-described processing, state data is transmitted from the processor 101*a* to the processor 101*b* at all times, and state data is transmitted from the processor 101*b* to the processor 101*a* at all times.

The task 201*a* of the processor 101*a* generates a processing request message to the task 201*b* and stores the processing request message in the transmission side region of the message region 173*a* of the shared memory region 161*a*. The task 201*a* calls the communication control task 202*a* and requests transmission of the processing request message.

The communication control task 202*a* generates LLI-MA to LLI-MC used for transmitting the processing request message and stores the LLI-MA to LLI-MC in the LLI region 151*a*.

The DMAC 112*a* of the processor 101*a* reads the LLI1-MA from the LLI region 151*a* and stores the LLI1-MA in the internal register. The DMAC 112*a* transmits the LLI-MB via the SPI 115*a* on the basis of the LLI-MA.

Meanwhile, the DMAC 112*b* of the processor 101*b* reads the LLI-R from the LLI region 151*b*, and stores the LLI-R in the internal register. The DMAC 112*b* receives the LLI-MB via the SPI 115*b* on the basis of the LLI-R, and stores the LLI-MB in the LLI region 151*b*.

The DMAC 112*a* of the processor 101*a* reads the LLI-MC from the LLI region 151*a* and stores the LLI-MC in the internal register. On the basis of the LLI-MC, the DMAC 112*a* transmits, via the SPI 115*a*, a processing request message stored in the transmission side region of the message region 173*a* of the shared memory region 161*a*.

The DMAC 112*b* of the processor 101*b* reads the LLI-MB from the LLI region 151*b*, and stores the LLI-MB in the internal register. The DMAC 112*b* receives the processing request message via the SPI 115*b* on the basis of the LLI-MB, and stores the processing request message in the reception side region of the message region 173*b* of the shared memory region 161*b*. Furthermore, the DMAC 112*b* transmits the interrupt notification to a communication control task 202*b* on the basis of the transfer completion notification control information set for the attribute of the LLI-MB.

The communication control task 202*b* reads the processing request message from the message region 173*b* of the shared memory region 161*b*, and transmits the processing request message to the task 201*b* as a task message. With this arrangement, the task 201*b* wakes up.

The task 201*b* performs predetermined processing according to the processing request message, and stores the BBS data indicating a processing result in the originating side region of the BBS region 172*b* of the shared memory region 161*b*. The task 201*b* calls the communication control task 202*b* and requests transmission of the BBS data.

The communication control task 202*b* generates LLI-BA to LLI-BC for transmitting the BBS data, and stores the LLI-BA to LLI-BC in the LLI region 151*b*.

The DMAC 112*b* of the processor 101*b* reads the LLI-BA from the LLI region 151*b*, and stores the LLI-BA in the internal register. The DMAC 112*b* transmits the LLI-BB via the SPI 115*b* on the basis of the LLI-BA.

The DMAC 112*a* of the processor 101*a* reads the LLI-R from the LLI region 151*a* and stores the LLI-R in the internal register. The DMAC 112*a* receives the LLI-BB via the SPI 115*a* on the basis of the LLI-R, and stores the LLI-BB in the LLI region 151*a*.

The DMAC 112*b* of the processor 101*b* reads the LLI-BC from the LLI region 151*b*, and stores the LLI-BC in the internal register. On the basis of the LLI-BC, the DMAC 112*b* transmits the BBS data stored in the BBS region 172*b* of the shared memory region 161*b* via the SPI 115*b*.

The DMAC 112*a* of the processor 101*a* reads the LLI-BB from the LLI region 151*a* and stores the LLI-BB in the internal register. The DMAC 112*a* receives the BBS data via the SPI 115*a* on the basis of the LLI-BB, and stores the BBS data in the reference side region of the BBS region 172*a* of the shared memory region 161*a*. With this arrangement, the BBS data is shared.

Furthermore, the task 201*b* of the processor 101*b* generates a processing response message to the task 201*a* and stores the processing response message in the transmission side region of the message region 173*b* of the shared memory region 161*b*. The task 201*b* calls the communication control task 202*b* and requests transmission of the processing response message.

The communication control task 202*b* generates the LLI-MA to LLI-MC for transmitting the processing response message, and stores the LLI-MA to LLI-MC in the LLI region 151*b*.

The DMAC 112*b* of the processor 101*b* reads the LLI-MA from the LLI region 151*b*, and stores the LLI-MA in the internal register. The DMAC 112*b* transmits the LLI-MB via the SPI 115*b* on the basis of the LLI-MA.

The DMAC 112*a* of the processor 101*a* reads the LLI-R from the LLI region 151*a* and stores the LLI-R in the internal register. The DMAC 112*a* receives the LLI-MB via the SPI 115*a* on the basis of the LLI-R, and stores the LLI-MB in the LLI region 151*a*.

The DMAC 112*b* of the processor 101*b* reads the LLI-MC from the LLI region 151*b*, and stores the LLI-MC in the internal register. On the basis of the LLI-MC, the DMAC 112*b* transmits the message stored in the message region 173*b* of the shared memory region 161*b* via the SPI 115*b*.

The DMAC 112*a* of the processor 101*a* reads the LLI-MB from the LLI region 151*a* and stores the LLI-MB in the internal register. The DMAC 112*a* receives the processing response message via the SPI 115*a* on the basis of the LLI-MB, and stores the processing response message in the reception side region of the message region 173*a* of the shared memory region 161*a*. Furthermore, the DMAC 112*a* transmits the interrupt notification to the communication control task 202*a* on the basis of the transfer completion notification control information set for the attribute of the LLI-MB.

The communication control task 202*a* reads the processing response message from the message region 173*a* of the shared memory region 161*a*, and transmits the processing response message to the task 201*a* as a task message. With this arrangement, the task 201*a* wakes up and checks the processing response message.

As described above, the BBS data and the message can be transferred between the processor 101a and the processor 101b with the state data being shared.

2. Application Example

Next, a specific application example of the present technology will be described with reference to FIGS. 13 and 14. Specifically, an example in which the present technology is applied to a camera system 400 will be described.

Figure 13:
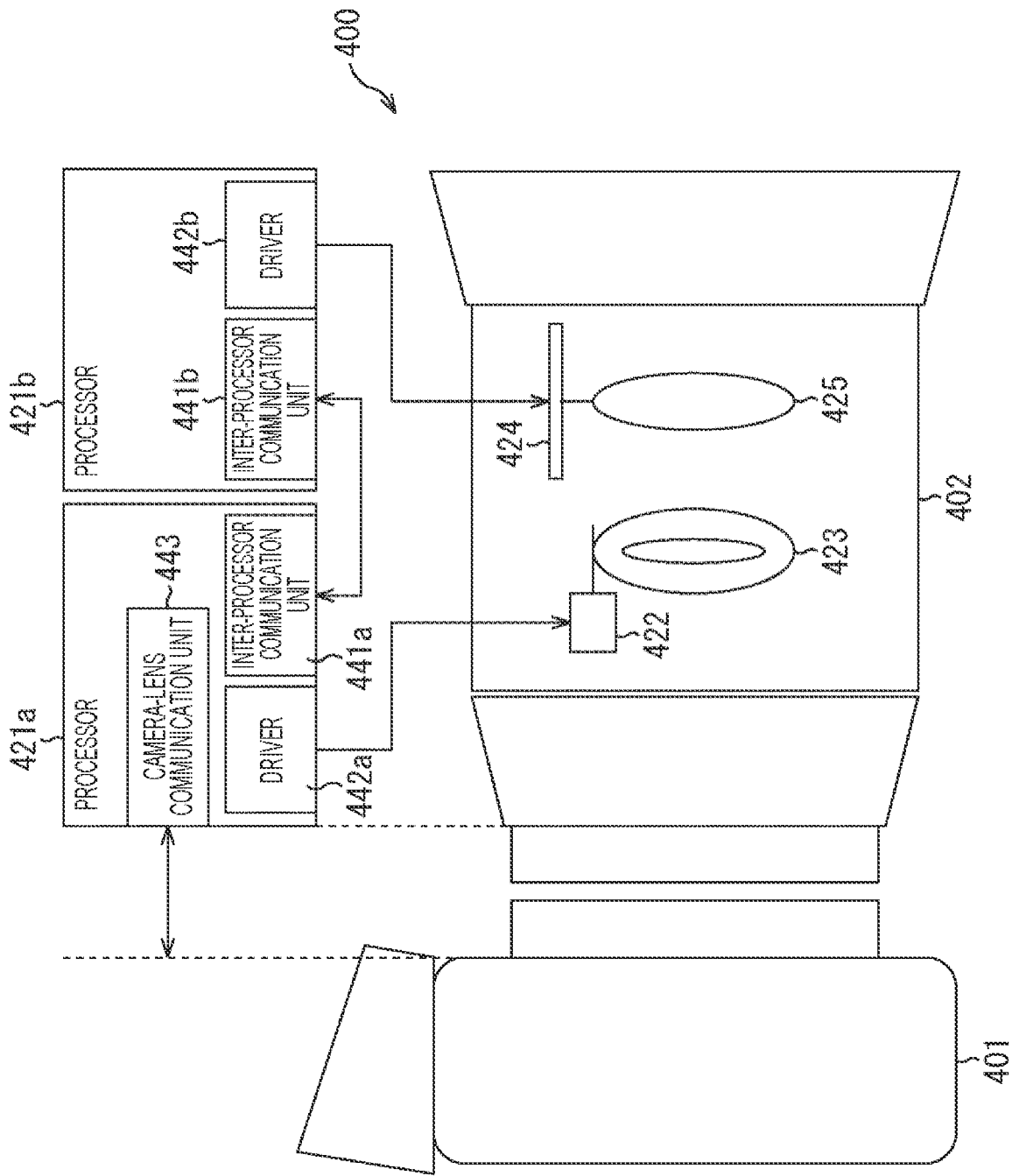
FIG. 13 is a block diagram illustrating a configuration example of a camera system.

FIG. 13 is a block diagram schematically illustrating a configuration example of the camera system 400.

The camera system 400 includes a camera body 401 and an interchangeable lens unit 402. The interchangeable lens unit 402 is detachable from the camera body 401.

For example, the information processing system 100 in FIG. 1 is applied to a lens control system of the interchangeable lens unit 402. The lens control system is a system that drives a diaphragm 423 and a focus lens 425 in accordance with an instruction from the camera body 401.

The lens control system includes a processor 421a, a processor 421b, a drive unit 422, the diaphragm 423, a drive unit 424, and the focus lens 425. The processor 421a and the processor 421b correspond to the processor 101a and processor 101b of the information processing system 100 in FIG. 1.

The processor 421a includes an inter-processor communication unit 441a, a driver 442a, and a camera-lens communication unit 443.

The processor 421b includes an inter-processor communication unit 441b and a driver 442b.

The driver 442a of the processor 421a controls the drive unit 422 including an actuator or the like to control aperture of the diaphragm 423.

The driver 442b of the processor 421b controls the drive unit 424 including an actuator or the like to control a position and the like of the focus lens 425.

Furthermore, the processor 421a receives an instruction from the camera body 401 via the camera-lens communication unit 443. The processor 421a transmits an instruction from the camera body 401 to the processor 421b via the inter-processor communication unit 441a as necessary.

Moreover, the processor 421a and the processor 421b transmit and receive a transfer parameter, state data, BBS data, a message, or the like via the inter-processor communication unit 441a and the inter-processor communication unit 441b. With this arrangement, the processor 421a and the processor 421b share information with each other and exchange various instructions.

Figure 14:
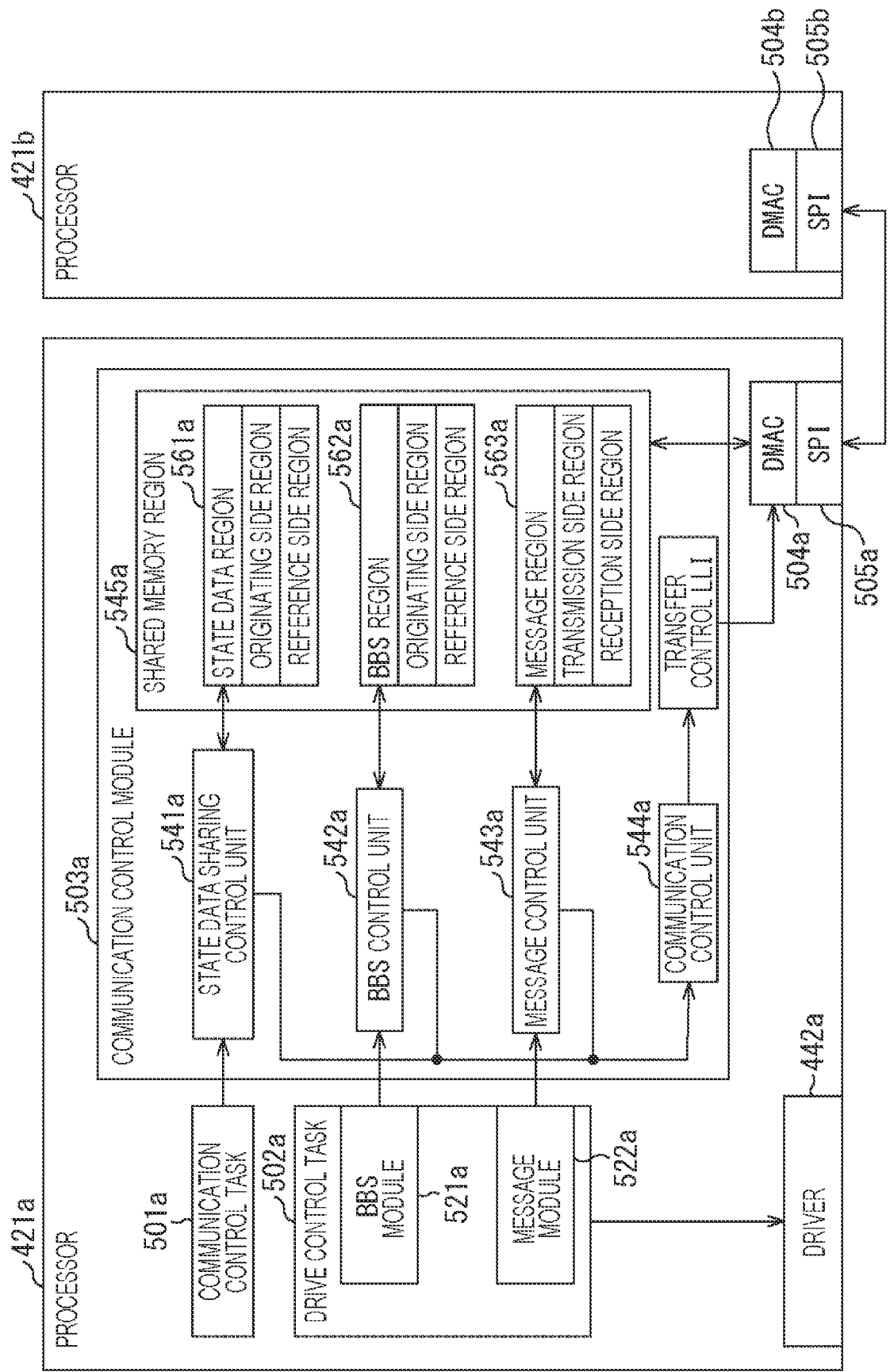
FIG. 14 is a block diagram illustrating a configuration example of software of an interchangeable lens unit.

FIG. 14 is a block diagram illustrating a configuration example of software of the processor 421a.

Note that a configuration example of software of the processor 421b is basically similar to the configuration example of the processor 421a, and description thereof will be appropriately omitted. Furthermore, a reference sign of each unit of the processor 421a is appended with a letter "a", and a reference sign of each unit of the processor 421b is appended with a letter "b".

The processor 421a includes the driver 442a, a communication control task 501a, a drive control task 502a, a communication control module 503a, a DMAC 504a, and an SPI 505a. The DMAC 504a and the SPI 505a correspond to the DMAC 112a and the SPI 115a of the processor 101a in FIG. 1, and constitute the inter-processor communication unit 441a in FIG. 13.

The drive control task 502a includes a BBS module 521a and a message module 522a.

The communication control module 503a includes a state data sharing control unit 541a, a BBS control unit 542a, a message control unit 543a, a communication control unit 544a, and a shared memory region 545a. The shared memory region 545a corresponds to the shared memory region 161a of the processor 101a in FIG. 2.

The shared memory region 545a is provided with a state data region 561a, a BBS region 562a, and a message region 563a. The state data region 561a, the BBS region 562a, and the message region 563a correspond to the state data region 171a, BBS region 172a, and message region 173a of the processor 101a in FIG. 2. The state data region 561a is provided with an originating side region and a reference side region. The BBS region 562a is provided with an originating side region and a reference side region. The message region 563a is provided with a transmission side region and a reception side region.

The communication control task 501a gives an instruction to the state data sharing control unit 541a and controls sharing of the state data with the processor 421b.

The drive control task 502a gives a drive instruction to the driver 442a and controls the drive unit 422 via the driver 442a to control aperture of the diaphragm 423 or the like.

The BBS module 521a generates BBS data to be shared with another task and supplies the BBS data to the BBS control unit 542a.

The message module 522a generates a message to be transmitted to another task, and supplies the message to the message control unit 543.

The communication control module 503a is a module that controls communication with the processor 421b. For example, the communication control module 503a controls transmission and reception of state data, BBS data, and a message with the processor 421b.

The state data sharing control unit 541a stores the state data shared with the processor 421b in the originating side region of the state data region 561a of the shared memory region 545a, and instructs the communication control unit 544a to transmit the state data.

The BBS control unit 542a stores the BBS data shared with the processor 421b in the originating side region of the BBS region 562a of the shared memory region 545a, and instructs the communication control unit 544a to transmit the BBS data.

In a case of transmitting a message to a task of the processor 421b, the message control unit 543a stores the message to be transmitted in the transmission side region of the message region 563a of the shared memory region 545a, and instructs the communication control unit 544a to transmit the message.

In a case where an instruction to transmit the state data, the BBS data, or the message is given, the communication control unit 544a generates a transfer control LLI and stores the transfer control LLI in an LLI region of an unillustrated RAM. The transfer control LLI includes, for example, the LLI-SA to LLI-SC, LLI-BA to LLI-BC, or LLI-MA to LLI-MC described above.

The state data region 561a of the shared memory region 545a stores state data shared with the processor 421b. In the originating side region, state data originated by the processor 421a is stored. In the reference side region, state data originated by the processor 421b and received from the processor 421b is stored.

By processing of transferring the above-described state data being performed, the state data stored in the originating side region of the state data region 561a of the processor 421a is transferred to the reference side region of a state data region 561b of the processor 421b in substantially real time, and data having the same content is stored in both. Furthermore, the state data stored in the originating side region of the state data region 561b of the processor 421b is transferred to a reference side region of the state data region 561a of the processor 421a in substantially real time, and data having the same content is stored in both.

The BBS region 562a of the shared memory region 545a stores BBS data shared with the processor 421b. In the originating side region, BBS data originated by the processor 421a is stored. In the reference side region, BBS data originated by the processor 421b and received from the processor 421b is stored.

By processing of transferring the above-described BBS data being performed, the BBS data stored in the originating side region of the BBS region 562a of the processor 421a is transferred to the reference side region of a BBS region 562b of the processor 421b in substantially real time, and data having the same content is stored in both. Furthermore, the BBS data stored in the originating side region of the BBS region 562b of the processor 421b is transferred to the reference side region of the BBS region 562a of the processor 421a in substantially real time, and data having the same content is stored in both.

For example, in a case where each task shares a processing result or the like with another task, the BBS is used. For example, the drive control task 502a can share the processing result with other tasks in the processor 421a and processor 421b by generating BBS data indicating the processing result and storing the BBS data in the originating side region of the BBS region 562a. Furthermore, for example, the drive control task 502a refers to the BBS data stored in the originating side region and reference side region of the BBS region 562a, thereby being able to know processing results or the like of the other tasks. For example, by referring to the BBS data, the drive control task 502a can collect information regarding drive states of the diaphragm 423 and focus lens 425 in order to analyze the drive instruction from the camera body 401.

The message region 563a of the shared memory region 545a stores a message transmitted to and received from the processor 421b. In the transmission side region, the message to be transmitted to the processor 421b is stored. In the reception side region, the message received from the processor 421b is stored.

By processing of transferring the above-described message being performed, the message stored in the transmission side region of the message region 563a of the processor 421a is transferred to a reception side region of a message region 563b of the processor 421b in substantially real time, and data having the same content is stored in both. Furthermore, the message stored in the transmission side region of the message region 563b of the processor 421b is transferred to a reception side region of the message region 563a of the processor 421a in substantially real time, and data having the same content is stored in both.

For example, a message is used to exchange an instruction between tasks of the processor 421a and processor 421b. For example, in a case where the drive control task 502a gives an instruction to the driver 442a or the like in the processor 421a, an internal message is used. Meanwhile, for example, the drive control task 502a generates a message indicating a drive instruction and stores the message in the transmission side region of the message region 563a, thereby giving the task in the processor 421b an instruction to drive the focus lens 425 or the like. Furthermore, for example, the drive control task 502a can receive an instruction to drive the diaphragm 423 or the like from a task in the processor 421b by reading a message stored in the reception side region of the message region 563a.

The DMAC 504a controls DMA in the processor 421a. For example, the DMAC 504a acquires the transfer control LLI from an LLI region of an unillustrated RAM, and transfers the LLI for data reception to the SPI 505a on the basis of the transfer control LLI, or reads state data, BBS data, and a message from the shared memory region 545a and transfers the state data, BBS data, and message to the SPI 505a.

Furthermore, the DMAC 504a stores, in the shared memory region 545a, the state data, the BBS data, and message received by the SPI 505a from the processor 421b. Moreover, the DMAC 504a stores, in the LLI region of the RAM, the transfer control LLI received by the SPI 505a from the processor 421b.

The SPI 505a performs full-duplex serial communication with an SPI 505b of the processor 421b.

As described above, the processor 421a and the processor 421b can execute control of the diaphragm 423 and the focus lens 425 independently of each other while seamlessly and closely sharing various types of information with a small load.

3. Modifications

Hereinafter, modifications of the above-described embodiment of the present technology will be described.

For example, a communication device other than an SPI can be used. For example, a communication device such as a universal asynchronous receiver/transmitter (UART), a serial input/output (SIO), an inter-integrated circuit (I2C), a universal serial bus (USB), or Ethernet can be used. Furthermore, for example, a communication device that performs parallel communication can be used.

Furthermore, for example, the present technology can also be applied to a case where communication between processors is half-duplex communication or simplex communication.

Moreover, for example, instead of the DMAC, a device such as a digital signal processor (DSP) or programmable logic device (PLD) having a DMA control function can be used.

Furthermore, each processor does not necessarily need to incorporate a memory that shares an address space, and an external memory may be provided outside each processor.

Moreover, as an information processing unit incorporated in each processor, a device such as a graphics processing unit (GPU) or a PLD can be used instead of the CPU.

Furthermore, the present technology can also be applied to a case where data is shared among information processing devices such as three or more processors.

Moreover, the present technology can be applied to a multiprocessor system other than a camera system.

4. Others

The above-described series of processing can be executed by hardware or can be executed by software. In a case where a series of processing is executed by software, a program included in the software is installed on a computer. Here, the computer includes, a computer incorporated in dedicated hardware, a general-purpose personal computer for example, which is capable of executing various kinds of functions by installing various programs, or the like.

A program executed by the computer can be provided by being recorded on a removable medium as a package medium, or the like, for example. Furthermore, the program can be provided via a wired or wireless transmission medium such as a local area network, the Internet, or digital satellite broadcasting.

Note that, the program executed by the computer may be a program that is processed in time series in an order described in this specification, or a program that is processed in parallel or at a necessary timing such as when a call is made.

Furthermore, in the present specification, the system means a set of a plurality of components (devices, modules (parts), or the like) without regard to whether or not all the components are in the same housing. Therefore, a plurality of devices housed in separate housings and connected via a network, and one device housing a plurality of modules in one housing are both systems.

Note that embodiments of the present technology are not limited to the above-described embodiments, and various changes can be made without departing from the scope of the present technology.

For example, the present technology can have a configuration of cloud computing in which one function is shared and processed jointly by a plurality of devices via a network.

Furthermore, each step described in the above-described flowcharts can be executed by one device, or can be executed by being shared by a plurality of devices.

Moreover, in a case where a plurality of pieces of processing is included in one step, the plurality of pieces of processing included in the one step can be executed by being shared by a plurality of devices, in addition to being executed by one device.

<Examples of Configuration Combination>

The present technology can have the following configurations.

(1)
An information processing system including
a first information processing device, and
a second information processing device,
in which the first information processing device includes
a first information processing unit that generates a transfer parameter used for controlling transfer of data,
a first direct memory access (DMA) control unit that controls DMA on the basis of the transfer parameter, and
a first communication unit,
the second information processing device includes
a second information processing unit that generates the transfer parameter,
a second DMA control unit that controls DMA on the basis of the transfer parameter, and
a second communication unit that communicates with the first communication unit,
the first information processing unit generates a first transfer parameter used for controlling reception of first transfer data,
the first DMA control unit controls transmission of the first transfer parameter to the second information processing device, and
the second DMA control unit controls reception of the first transfer data from the first information processing device on the basis of the first transfer parameter.

(2)
The information processing system according to (1),
in which the first information processing unit generates a second transfer parameter used for controlling transmission of the first transfer parameter, and a third transfer parameter used for controlling transmission of the first transfer data, and
the first DMA control unit controls transmission of the first transfer parameter to the second information processing device on the basis of the second transfer parameter, and controls transmission of the first transfer data to the second information processing device on the basis of the third transfer parameter.

(3)
The information processing system according to (2),
in which the transfer parameter has a linked list structure, and
the first information processing unit sets the third transfer parameter for a link destination of the second transfer parameter, and sets the second transfer parameter for a link destination of the third transfer parameter.

(4)
The information processing system according to (3),
in which, on the basis of the second transfer parameter and the third transfer parameter, the first DMA control unit alternately repeats control of transmission of the first transfer parameter to the second information processing device, and control of transmission of the first transfer data to the second information processing device.

(5)
The information processing system according to (4),
in which the first transfer data includes state data indicating a state of the first information processing device.

(6)
The information processing system according to any one of (2) to (5),
in which, in a case of transmitting second transfer data stored in a position different from a position of the first transfer data of a first storage unit to the second information processing device, the first information processing unit generates a fourth transfer parameter used for controlling reception of the second transfer data,
the first DMA control unit controls transmission of the fourth transfer parameter to the second information processing device, and
the second DMA control unit controls reception of the second transfer data from the first information processing device on the basis of the fourth transfer parameter.

(7)
The information processing system according to (6),
in which the first information processing unit sets a fifth transfer parameter used for controlling transmission of the second transfer parameter, and a sixth transfer parameter used for controlling transmission of the second transfer data, and
the first DMA control unit controls transmission of the second transfer parameter to the second information processing device on the basis of the fifth transfer parameter, and controls transmission of the second transfer data to the second information processing device on the basis of the sixth transfer parameter.

(8)
The information processing system according to (7),
in which the transfer parameter has a linked list structure, and
the first information processing unit sets a link destination of the second transfer parameter to the third transfer parameter, sets a link destination of the third transfer parameter to the second transfer parameter, and, in a case of transmitting the second transfer data to the second information processing device, changes the link destination of the third transfer parameter to the fifth transfer parameter.

(9)

The information processing system according to any one of (1) to (8), in which, in a case where the first transfer data includes a message between tasks, the first information processing unit sets, for the first transfer parameter, control information that causes an interrupt notification of transfer completion of the first transfer data to be generated.

(10)

The information processing system according to (9), in which, in a case where the control information is set for the first transfer parameter, the second DMA control unit makes an interrupt notification to the second information processing unit after controlling reception of the first transfer data.

(11)

The information processing system according to any one of (1) to (10), in which, in the first transfer parameter, the first information processing unit sets, for a transfer destination of the first transfer data, a position of a second storage unit corresponding to a position, in the first storage unit, where the first transfer data is stored, and the second DMA control unit stores the first transfer data in a position of the second storage unit set, in the first transfer parameter, as a transfer destination.

(12)

The information processing system according to (11), in which at least a part of a region of the first storage unit and at least a part of a region of the second storage unit share an address space.

(13)

The information processing system according to any one of (1) to (12), in which the second information processing unit generates a seventh transfer parameter used for controlling reception of the first transfer parameter, and the second DMA control unit controls reception of the first transfer parameter on the basis of the seventh transfer parameter.

(14)

The information processing system according to (13), in which the transfer parameter has a linked list structure, the first information processing unit sets the seventh transfer parameter for a link destination of the first transfer parameter, and the second information processing unit sets the first transfer parameter for a link destination of the seventh transfer parameter.

(15)

The information processing system according to any one of (1) to (14), in which the first transfer data includes state data indicating a state of the first information processing device, data for sharing information output from a task of the first information processing device, or a message from a task of the first information processing device to a task of the second information processing device.

(16)

The information processing system according to any one of (1) to (15), in which the first communication unit and the second communication unit perform full-duplex communication.

(17)

The information processing system according to any one of (1) to (16), in which the transfer parameter has a linked list structure, and includes a transfer source and transfer destination of data, and a link destination.

(18)

An information processing method including a first information processing device that controls direct memory access (DMA) on the basis of a transfer parameter used for controlling transfer of data, and a second information processing device that communicates with the first information processing device, and controls DMA on the basis of the transfer parameter, in which the first information processing device generates the transfer parameter used for controlling reception of transfer data, and transmits the transfer parameter to the second information processing device, and the second information processing device controls reception of the transfer data from the first information processing device on the basis of the transfer parameter received from the first information processing device.

(19)

An information processing device including an information processing unit that generates a transfer parameter used for controlling transfer of data, a direct memory access (DMA) control unit that controls DMA on the basis of the transfer parameter, and a communication unit that communicates with another information processing device, in which the information processing unit generates the transfer parameter used for controlling reception of transfer data, and the DMA control unit controls transmission of the transfer parameter to the another information processing device, the transfer parameter being used for controlling reception of the transfer data.

(20)

An information processing device including a direct memory access (DMA) control unit that controls DMA on the basis of a transfer parameter used for controlling transfer of data, and a communication unit that communicates with another information processing device, in which the communication unit receives, from another information processing device, the transfer parameter used for controlling reception of transfer data, and the DMA control unit controls reception of the transfer data from the another information processing device on the basis of the transfer parameter received from the another information processing device.

Note that the effects described herein are only examples, and the effects of the present technology are not limited to these effects. Additional effects may also be obtained.

REFERENCE SIGNS LIST

100 Information processing system
101a, 101b Processor
111a, 111b CPU
112a, 112b DMAC
115a, 115b SPI
151a, 151b LLI region
161a, 161b Shared memory region 171a, 171b State data region
172a, 172b BBS region
173a, 173b Message region
400 Camera system
401 Camera body
402 Interchangeable lens unit
421a, 421b Processor
441a, 441b Inter-processor communication unit
442a, 442b Driver
501a Communication control task
502a Drive control task
503a Communication control module
504a, 504b DMAC
505a, 505b SPI
541a State data sharing control unit
542a BBS control unit
543a Message control unit
544a Communication control unit
545a Shared memory region
561a State data region
562a BBS region
563a Message region

The invention claimed is:

1. An information processing system, comprising:
a first information processing device that includes:
   a first information processing unit configured to:
      generate a first transfer parameter to control transfer of data, and
      generate a second transfer parameter for reception of first transfer data,
   a first direct memory access (DMA) control unit configured to:
      control DMA based on the first transfer parameter, and
      control transmission of the second transfer parameter to a second information processing device, and
   a first communication unit, wherein
      the first transfer parameter has a linked list structure,
      the first transfer parameter includes a transfer source address of data, transfer destination address of data, and a link destination, and
      the transfer destination address of data corresponds to a transmission channel address of the first communication unit; and
the second information processing device includes:
   a second information processing unit configured to generate the first transfer parameter,
   a second DMA control unit configured to:
      control DMA based on the first transfer parameter,
      control the reception of the first transfer data from the first information processing device based on the second transfer parameter, and
   a second communication unit configured to communicate with the first communication unit.

2. The information processing system according to claim 1, wherein
the first information processing unit is further configured to:
   generate a third transfer parameter to control transmission of the second transfer parameter, and
   generate a fourth transfer parameter to control transmission of the first transfer data, and
the first DMA control unit is further configured to:
   control the transmission of the second transfer parameter to the second information processing device based on the third transfer parameter, and
   control transmission of the first transfer data to the second information processing device based on the fourth transfer parameter.

3. The information processing system according to claim 1, wherein
the first information processing unit is further configured to set, for the second transfer parameter, control information based on a determination that the first transfer data includes a message between tasks, and
the control information is for an interrupt notification of transfer completion of the first transfer data.

4. The information processing system according to claim 1, wherein
the first information processing unit is further configured to set, in the second transfer parameter, a transfer destination of the first transfer data as a position of a storage unit of the second information processing device,
the position of the storage unit of the second information processing device is corresponding to a position in a storage unit of the first information processing device where the first transfer data is stored, and
the second DMA control unit is further configured to store the first transfer data in the position of the storage unit of the second information processing device as the transfer destination.

5. The information processing system according to claim 1, wherein
the second information processing unit is further configured to generate a third transfer parameter to control reception of the second transfer parameter, and
the second DMA control unit is further configured to control reception of the second transfer parameter based on the third transfer parameter.

6. The information processing system according to claim 1, wherein the first transfer data includes one of state data indicating a state of the first information processing device, data for sharing information output from a task of the first information processing device, or a message from a task of the first information processing device to a task of the second information processing device.

7. The information processing system according to claim 1, wherein the first communication unit and the second communication unit are further configured to perform full-duplex communication.

8. The information processing system according to claim 2, wherein the first information processing unit is further configured to:
set the fourth transfer parameter for a link destination of the third transfer parameter, and
set the third transfer parameter for a link destination of the fourth transfer parameter.

9. The information processing system according to claim 2, wherein
in a case the first information processing unit is configured to transmit second transfer data to the second information processing device, the first information processing unit is further configured to generate a fifth transfer parameter to control reception of the second transfer data,
the second transfer data is at a position different from a position of the first transfer data of a first storage unit,
the first DMA control unit is further configured to control transmission of the fifth transfer parameter to the second information processing device, and the second DMA control unit is further configured to control reception of the second transfer data from the first information processing device based on the fifth transfer parameter.

10. The information processing system according to claim 3, wherein the second DMA control unit is further configured to make the interrupt notification to the second information processing unit based on a control of reception of the first transfer data.

11. The information processing system according to claim 4, wherein at least a part of a region of the storage unit of the first information processing device and at least a part of a region of the storage unit of the second information processing device share an address space.

12. The information processing system according to claim 5, wherein
the first information processing unit is further configured to set the third transfer parameter for a link destination of the second transfer parameter, and
the second information processing unit is further configured to set the second transfer parameter for a link destination of the third transfer parameter.

13. The information processing system according to claim 8, wherein the first DMA control unit is further configured to alternately repeat, based on the third transfer parameter and the fourth transfer parameter, control of transmission of the second transfer parameter to the second information processing device, and control of transmission of the first transfer data to the second information processing device.

14. The information processing system according to claim 9, wherein
the first information processing unit is further configured to:
set a sixth transfer parameter to control transmission of the third transfer parameter, and
a seventh transfer parameter to control transmission of the second transfer data, and
the first DMA control unit is further configured to:
control transmission of the third transfer parameter to the second information processing device based on the sixth transfer parameter, and
control transmission of the second transfer data to the second information processing device based on the seventh transfer parameter.

15. The information processing system according to claim 13, wherein the first transfer data includes state data that indicates a state of the first information processing device.

16. The information processing system according to claim 14, wherein
the first information processing unit is further configured to:
set a link destination of the third transfer parameter to the fourth transfer parameter,
set a link destination of the fourth transfer parameter to the third transfer parameter,
change the link destination of the fourth transfer parameter to the sixth transfer parameter, and
transmit, based on the changed link destination of the fourth transfer parameter to the sixth transfer parameter, the second transfer data to the second information processing device.

17. An information processing method, comprising:
controlling, by a first information processing device, direct memory access (DMA) based on a first transfer parameter, wherein
the first transfer parameter is for controlling transfer of data, the first transfer parameter has a linked list structure,
the first transfer parameter includes a transfer source address of data, transfer destination address of data, and a link destination, and
the transfer destination address of data corresponds to a transmission channel address of a communication unit of the first information processing device;
generating, by the first information processing device, a second transfer parameter for controlling reception of transfer data;
transmitting, by the first information processing device, the second transfer parameter to a second information processing device;
controlling, by the second information processing device, DMA based on the first transfer parameter, wherein the second information processing device communicates with the first information processing device;
receiving, by the second information processing device, the second transfer parameter from the first information processing device; and
controlling, by the second information processing device, reception of the transfer data from the first information processing device based on the received second transfer parameter.

18. A first information processing device, comprising:
an information processing unit configured to:
generate a first transfer parameter to control transfer of data, and
generate a second transfer parameter to control reception of transfer data;
a direct memory access (DMA) control unit configured to:
control DMA based on the first transfer parameter, and
controls transmission of the second transfer parameter to a second information processing device, wherein the second transfer parameter is to control a reception of the transfer data; and
a communication unit configured to communicate with a second information processing device, wherein
the first transfer parameter has a linked list structure,
the first transfer parameter includes a transfer source address of data, transfer destination address of data, and a link destination, and
the transfer destination address of data corresponds to a transmission channel address of the communication unit.

19. A first information processing device, comprising:
a communication unit configured to:
communicate with a second information processing device,
receive from the second information processing device, a second transfer parameter, wherein the second transfer parameter is to control a reception of transfer data; and
a direct memory access (DMA) control unit configured to:
control DMA based on a transfer parameter that controls transfer of data, and
control reception of the transfer data from the second information processing device based on the received second transfer parameter,
the second transfer parameter has a linked list structure,
the second transfer parameter includes a transfer source address of data, transfer destination address of data, and a link destination, and the transfer source address of data corresponds to a reception channel address of the communication unit.

* * * * *